(12) United States Patent
Shukla et al.

(10) Patent No.: US 11,483,766 B1
(45) Date of Patent: Oct. 25, 2022

(54) PROTECTED POWER MANAGEMENT TRANSITIONS IN WIRELESS NETWORKS

(71) Applicant: Amazon Technologies, Inc., Seattle, WA (US)

(72) Inventors: Ashish Kumar Shukla, Milpitas, CA (US); Avinash Joshi, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 385 days.

(21) Appl. No.: 16/562,059

(22) Filed: Sep. 5, 2019

(51) Int. Cl.
*H04W 52/02* (2009.01)
*H04W 48/10* (2009.01)
*H04W 48/20* (2009.01)
*G06F 1/3206* (2019.01)
*H04W 12/06* (2021.01)
*H04L 61/103* (2022.01)
*H04W 84/12* (2009.01)
*H04L 101/622* (2022.01)

(52) U.S. Cl.
CPC ...... *H04W 52/0209* (2013.01); *G06F 1/3206* (2013.01); *H04L 61/103* (2013.01); *H04W 12/06* (2013.01); *H04W 48/10* (2013.01); *H04W 48/20* (2013.01); *H04L 2101/622* (2022.05); *H04W 84/12* (2013.01)

(58) Field of Classification Search
CPC . H04W 52/0209; H04W 12/06; H04W 48/10; H04W 48/20; H04W 84/12; G06F 1/3206; H04L 61/103; H04L 61/6022
USPC .................................................. 370/311, 338
See application file for complete search history.

(56) References Cited

U.S. PATENT DOCUMENTS

| 11,064,435 | B1* | 7/2021 | Deng | H04W 56/001 |
| 2007/0293218 | A1* | 12/2007 | Meylan | H04W 56/0045 |
| | | | | 455/434 |
| 2009/0124301 | A1* | 5/2009 | Raissinia | H04W 52/0216 |
| | | | | 455/574 |
| 2010/0165959 | A1* | 7/2010 | Park | H04W 72/1215 |
| | | | | 370/338 |
| 2013/0308618 | A1* | 11/2013 | Panneerselvam | G01S 5/14 |
| | | | | 370/338 |
| 2017/0135120 | A1* | 5/2017 | Hiremath | H04W 12/062 |

(Continued)

OTHER PUBLICATIONS

LAN/MAN Standards Committee of the IEEE Computer Society, "Part 11: Wireless LAN Medium Access Control (MAC) and Physical Layer (PHY) Specifications," Dec. 7, 2016, pp. 1-3534, IEEE Std 802.11-2016, The Institute of Electrical and Electronics Engineers, Inc., New York, NY, USA.

*Primary Examiner* — Kwang B Yao
*Assistant Examiner* — Syed M Bokhari
(74) *Attorney, Agent, or Firm* — Kilpatrick Townsend & Stockton LLP

(57) ABSTRACT

Techniques for increasing the security and reliability of frame transmission are described. In an example, a network access device transmits a first frame indicating that a protected frame is to be used for a power mode change. The network access device receives a second frame that includes an identifier of a device and a change to a power mode of the device. The network access device determines whether the second frame is protected. In addition, the network access device determines whether data received for the device is to be stored prior to transmission to the device based at least in part on whether the second frame is protected.

18 Claims, 11 Drawing Sheets

(56) References Cited

U.S. PATENT DOCUMENTS

2018/0049131 A1\* 2/2018 Huang .............. H04W 52/0235
2019/0028967 A1\* 1/2019 Ahn .................... H04L 27/0008

\* cited by examiner

PROTECTED POWER MANAGEMENT TRANSITIONS IN WIRELESS NETWORKS

BACKGROUND

In a wireless environment, such as in an IEEE 802.11 wireless network, an access point communicates wirelessly with computing devices. At the data link layer (e.g., the L2 layer), the access point can receive, from a source, frames that include an address of a computing device and can transmit such frames to the computing device. Conversely, the access point can receive, from the computing device, frames that include an address of a destination and can transmit such frames to the destination.

A computing device can transition in and out of a power save mode. When in the power save mode, the computing device may not transmit and/or receive data, thereby saving power.

BRIEF DESCRIPTION OF THE DRAWINGS

Various embodiments in accordance with the present disclosure will be described with reference to the drawings, in which.

DETAILED DESCRIPTION

Figure 1:
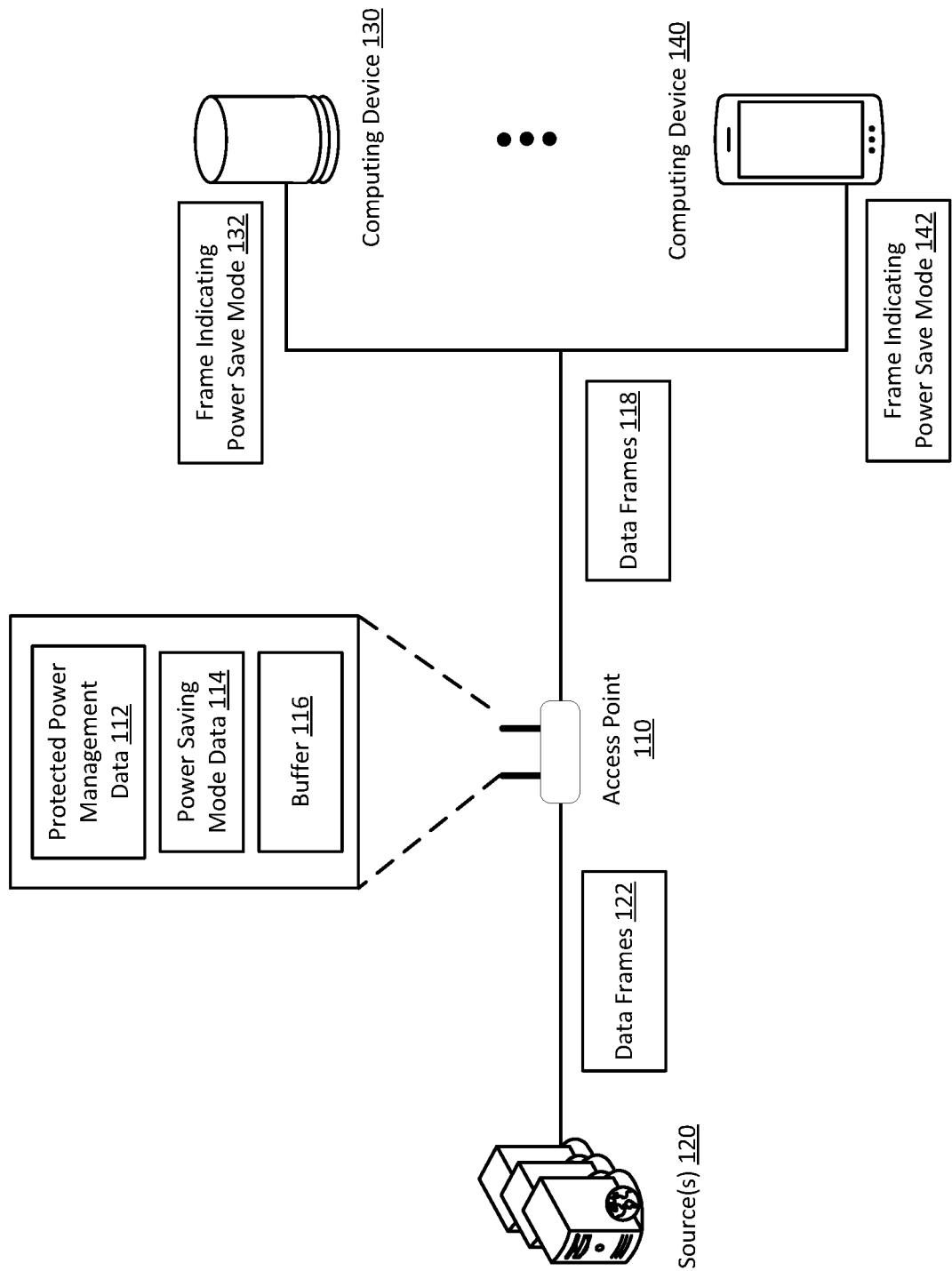
FIG. 1 illustrates an example computing environment for a protected power management mode according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In existing systems, a computing device may use an unprotected frame to indicate, to a network access device (e.g., a wireless access point), a transition associated with a power save mode (e.g., either entering or exiting the power save mode). The transition in or out of the power save mode improves the power management of the computing device. When the computing device is in the power save mode, the network access device stores and does not transmit (e.g., buffers) frames that are received and that are addressed to the computing device (e.g., include a media access control (MAC) address of the computing device as the receiver address in the MAC header of the frame). When the computing device exits the power saving mode, the network access device transmits the stored and other received frames to the computing devices. However, a network security risk can arise due to the use of the unprotected frame, as further illustrated in FIGS. 3 and 4.

Embodiments of the present disclosure are directed to, among other things, improving the security of a computer network by more reliably transmitting frames to computing devices of the computer network. In an example, the embodiments mitigate or eliminate the security risk by using a protected power management mode. The protected power management mode represents an operational mode in which a network access device may recognize and enforce a transition of a computing device into a power save mode or out of the power save mode if a protected frame is used and, otherwise, may ignore an unprotected frame. In an example, the network access device transmits a frame (e.g., a beacon frame) indicating the capability of the protected power management mode. The computing device may optionally respond with a request for the capability. If so, the network access device stores data indicating the requested capability. Upon receiving a frame from the computing device indicating a transition into or out of the power save mode, the network access device may determine whether the frame is protected. Different types of protection are possible to generate a protected frame and include, for instance, encryption of the payload of the frame, authentication of the frame, and/or authentication of the MAC header of the frame. In an example, the protected frame is a frame that has an encrypted per the IEEE 802.11 encryption standard. On one hand, if the frame is protected and the protection is verified (e.g., the payload is successfully decrypted, the frame is authenticated, and/or the MAC header is authenticated), the network access device stores data indicating the transition (e.g., the computing device is in the power save mode or out of the power save mode, as applicable). Frames that are subsequently received and addressed to the computing device are processed according to the data (e.g., buffered if the computing device is into the power save mode; otherwise, transmitted to the computing device). On the other hand, if the frame is not protected or the protection verification fails, the network access device can ignore the frame and may not recognize the transition. A null frame and a public action management frame are unprotected frame per the IEEE 802.11 encryption standard. In particular, the null frame has no payload and the public action management frame is not encrypted.

To illustrate, consider an example of a wireless access point and a computing device. As part of establishing a data connection between the wireless access point and the computing device, the wireless access point transmits a beacon frame indicating that it supports and has enabled the capability of the protected power management mode, where this indication is included in an extended capability element or a vendor element within the MAC header of the beacon frame. The computing device receives the beacon frame, determines that the wireless access point supports and has enabled the capability, and transmits a probe request frame indicating that the computing device likewise supports and has enabled the capability. The wireless access point can store data indicating that the protected power management mode is available to the computing device in response to the probe request. Subsequently, the data connection is established and data frames that include the MAC address of the computing device are transmitted from the wireless access point to the computing device. As part of entering a power save mode, and if the computing device has no pending data to transmit to the wireless access point, the computing device transmits an address resolution protocol (ARP) frame rather than, for instance a quality of service (QoS) null frame (or any other frame that has an empty payload). The ARP frame includes a MAC header, an encrypted payload, and a checksum. The MAC header includes a power management bit set to "1" indicating that the device is entering or has entered the power save mode. The encrypted payload includes additional authentication data (AAD) generated based on some of the information in the MAC header. The wireless access point decrypts the payload, validates the checksum, and generates a hash from the MAC header and determines that the hash is the same as or sufficiently similar to the AAD, thereby determining that the ARP frame is properly protected. In this case, the wireless access point stores data indicating that the computing device has entered the power saving mode. Frames received from that point on and including the MAC address of the computing device are stored in a memory buffer of the wireless access point until the computing device exits the power save mode, or a predefined time out time duration.

Similarly, as part of exiting the power save mode, and if the computing device has no pending data to transmit to the wireless access point, the computing device transmits another ARP frame rather than, for instance, a QoS null frame (or any other frame that has an empty payload). The ARP frame includes a MAC header, an encrypted payload, and a checksum. The MAC header includes a power management bit set to "0" indicating that the device is exiting or has exited the power save mode. The encrypted payload includes AAD generated based on some of the information in the MAC header. The wireless access point decrypts the payload, validates the checksum, and generates a hash from the MAC header and determines that the hash is the same as or sufficiently similar to the AAD, thereby determining that the ARP frame is properly protected. In this case, the wireless access point stores data indicating that the computing device has exited the power saving mode. Accordingly, the wireless access point transmits, to the computing device, frames that were stored in the memory buffer and frames received from that point on and including the MAC address of the computing device.

Embodiments of the present disclosure provide many technical advantages over existing computer networks, including improved security and higher transmission reliability. In particular, and as further described in connection with FIGS. 3-6, by using protected frames, the risk of spoofing a network access device to incorrectly recognize that a computing device is in or out of a power saving mode is significantly reduced. In turn, data frames can be more reliably transmitted to the computing device because the network access device can more properly determine when the computing device is in the power save mode or out of the power save mode.

In the interest of clarity of explanation, various embodiments of the present disclosure are described in conjunction with an access point that supports a wireless transmission. However, the embodiments are not limited as such and similarly apply to any other type of connections, whether wired or wireless, and to any other type of network access devices. A network access device is generally a transmission device that manages, provides, controls, and/or facilitates access of one or more other computing devices to a computer network including a local area network, a wide area network, or a mesh network. A network hub, a network switch, a network router, an access point, a node in a mesh network, and any combination of such devices are examples of a network access device. For instance, the embodiments can be implemented in any type of computer network that is based on a IEEE 802.11 standard, such as IEEE 802.11 U-APSD (unscheduled automatic power save delivery), tunneled direct link setup (TDLS) peer, ad-hoc independent basic service set (IBSS), and mesh basic service (MBSS).

FIG. 1 illustrates an example computing environment for a protected power management mode according to an embodiment of the present disclosure. As illustrated, the computing environment includes an access point 110, one or more sources 120, and a number of computing devices (FIG. 1 illustrates a first computing device 130, and a second computing device 140, although the computing environment can include a different number of computing devices). In an example, the access point 110 supports the capability of the protected power management mode, whereby data frames are transmitted or stored for the computing devices depending on whether protected frames were used to indicate their power save mode.

In an example, the one or more sources 120 include a computing resource that stores media (e.g., audio and/or video content, files, etc.) and that transmits the media in data frames 122 at the data link layer. For instance, the computing resource is a content server that supports media streaming.

The access point 110 is a wireless access point that manages the wireless access of a computing device to a home network and to a public network, such as the Internet. The wireless access point also receives the data frames 122. Some of the data frames 122 are transmitted immediately (e.g., without being stored in a memory buffer), whereas other ones are stored (e.g., in the memory buffer) for a time duration prior to transmission to the computing devices on the home network as applicable. The transmitted data frames from the access point 110 are shown as data frames 118 in FIG. 1. The home network includes the access point 110, the first computing device 130, and the second computing device 140.

A computing device (e.g., any of the first computing device 130 or the second computing device 140) can be a device that includes suitable hardware and software (e.g., one or more processors and one or more memories storing computer-readable instructions) to support the receipt and transmission of frames, including data frames and management frames, at the data link layer. For instance, the computing device can be any of a mobile phone such as a smartphone, a tablet, a laptop, a personal computer, a smart speaker, a smartwatch, a smart appliance, or any other IOT device or user device.

In an example, if the capability for the protected power management mode should be available to computing devices, the access point 110 stores protected power management data 112 for the computing devices. In particular, the protected power management data 112 associates each of such computing devices with the protected power management mode. For instance, the association is stored as information in a table, where the MAC address of a computing device is one entry of a row and a bit is set to "1" in another entry of the row. A "1" bit indicates that the protected power management mode is applicable to the computing device having the MAC address, whereas a "0" bit indicates that the protected power management mode is not applicable to the computing device.

In addition, the access point 110 stores power saving mode data 114 indicating that the computing devices are in a power saving mode. A power saving mode for a computing device represents an operational mode in which the computing device uses a relatively smaller amount of power than its normal operational mode. In an illustration, a table can be used to store the power saving mode data 114. For instance, an entry in a row of the table can include the MAC address of the computing device and another entry in the row can include a bit. If this bit is set to "1," the "1" bit indicates that the computing device having the MAC address is in the power save mode, whereas a "0" bit indicates that the computing device is not in the power save mode.

Further, the access point 110 includes a memory buffer 116. Frames (whether data frames or management frames) that are received by the access point 110 and are addressed to a computing device (e.g., include a MAC address of the computing device as the receiver address in the MAC header of the frame) can be stored in the memory buffer 116 when the power and saving data 114 indicate that the computing device is in the power save mode. Otherwise, such frames are transmitted without being stored in the memory buffer 116. Frames (whether data frames or management frames) that are in the memory buffer 116 and that are addressed to a computing device can be transmitted from the memory buffer 116 to the computing device upon a change to the power saving mode 114 indicating that the computing device is out of the power save mode.

In an example, the first computing device 130 is entering a power save mode.

Accordingly, the first computing device 130 sends a frame 132 to the access point 110, where the frame 132 indicates that the first computing device 130 is entering the power save mode. For instance, the MAC header of the frame 132 includes a power management (PM) bit set to "1." If the first computing device 130 has pending data or management controls to transmit, the frame 132 is a protected data frame or a protected management frame. Otherwise, the first computing device 130 may send an unprotected frame as the frame 132, such as a QoS null frame that has an empty payload, or for improved security, can send a protected frame as the frame 132, such as an ARP frame. In this case, the payload of the protected frame (e.g., the ARP frame) includes AAD and is protected and/or the protected frame can include a checksum.

Upon receiving the frame 132 from the first computing device 130, the access point 110 can check the protected power management data 112 to determine whether the protected power management mode is applicable to the first computing device 130. If so, the access point 110 may discard the frame 132 if unprotected (e.g., a QoS null frame) or if any of the decryption of the payload, verification of the checksum, and/or verification of the AAD fails. Otherwise, the access point 110 updates the power saving mode data 114 to indicate that the first computing device 130 is in the power save mode.

Similar processing can be performed when the first computing device 130 exits the power save mode. In the interest of clarity, such processing is illustrated in connection with the second computing device 140.

In an example, the second computing device 140 is exiting a power save mode.

Accordingly, the second computing device 140 sends a frame 142 to the access point 110, where the frame 142 indicates that the second computing device 140 is exiting the power save mode. For instance, the MAC header of the frame 142 includes a power management (PM) bit set to "0." If the second computing device 140 has pending data or management controls to transmit, the frame 142 is a protected data frame or a protected management frame. Otherwise, the second computing device 140 may send an unprotected frame as the frame 142, such as a QoS null frame that has an empty payload, or for improved security can send a protected frame as the frame 142, such as an ARP frame. In this case, the payload of the protected frame (e.g., the ARP frame) includes AAD and is protected and/or the protected frame can include a checksum.

Upon receiving the frame 142 from the second computing device 140, the access point 110 can check the protected power management data 112 to determine whether the protected power management mode is applicable to the second computing device 140. If so, the access point 110 may discard the frame 142 if unprotected (e.g., a QoS null frame) or if any of the decryption of the payload, verification of the checksum, and/or verification of the AAD fails. Otherwise, the access point 110 updates the power saving mode data 114 to indicate that the second computing device 140 is no longer in the power save mode.

In certain situations, the second computing device 140 may attempt to spoof the access point 110 to change the power saving mode data stored for the first computing device 130 to indicate an incorrect power save mode of the first computing device 130 (e.g., to indicate that the first computing device 130 is in the power save mode when it actually is not, and vice versa). In these situations, the second computing device 140 can, but need not, be on the home network. For instance, no data connection may have been established between the second computing device 140 and the access point 110 for the attempted spoofing to occur. In both cases (e.g., whether on the home network or not), the second computing device 140 sends an unprotected frame (e.g., a QoS null frame) indicating the incorrect power save mode of the first computing device 130. For instance, the unprotected frame includes a MAC header, but no payload. In turn, the MAC header includes the MAC address of the first computing device 130, rather than the MAC address of the second computing device 140, as the source address and the MAC address of the access point 110 as the receiver address.

Upon receiving the unprotected frame from the second computing device, the access point 110 can, by default, discard the unprotected frame. Additionally or alternatively, the access point 110 can determine that the protected power management mode is applicable to the first computing device 110 and, based on this determination, discard the unprotected frame. For instance, the access point 110 can determine the MAC address of the first computing 130 from the unprotected frame, look-up the protected power management data 112 by using the MAC address, determine that the protected power management mode is applicable to the first computing device 110, determine that the unprotected frame does not have the proper protection (e.g., the decryption fails, no authentication can be performed, AAD is available, etc.), and then discard the unprotected frame.

Figure 2:
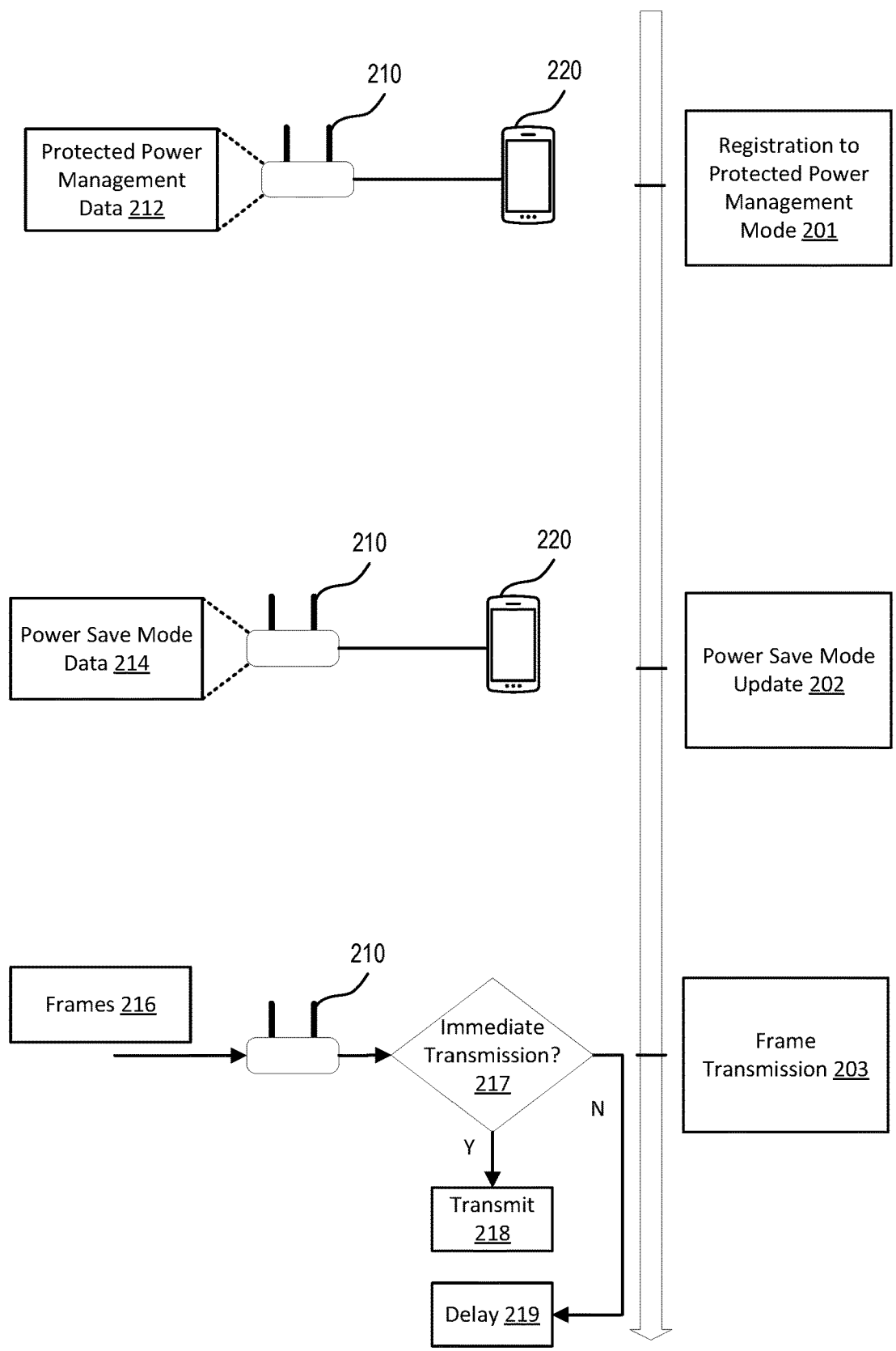
FIG. 2 illustrates example stages for using a protected power management mode according to an embodiment of the present disclosure.

FIG. 2 illustrates example stages for using a protected power management mode according to an embodiment of the present disclosure. In an example, an access point 210 manages frame transmissions to computing devices including a computing device 220. The computing device 220 may enter a power save mode or exit the power save mode. The transmission of frames from the access point 110 to the computing device can depend on the power save mode. The access point 210 and the computing device 220 are examples of the access point 110 and the computing device 130, respectively, of FIG. 1. As illustrated, managing the multicast traffic can be performed in multiple stages, including a first stage 201 for a registration to the protected power management mode, a second stage 202 for a power saving mode update, and a third stage 203 for transmitting the frames.

In an example, during the first stage 201, the access point 210 advertises its capability for providing the protected power management mode. For instance, the access point 210 sends a frame that includes a MAC header indicating the capability. The frame can be any of a beacon frame, a probe response frame, or an association response frame. The MAC header can include an extended capabilities element and/or a vendor specific element that indicates the capability.

The extended capabilities element can include a first bit indicating that the capability is supported (e.g., that a protected frame is to be used for a transition into a power save or out of the power save mode) and a second bit indicating that the capability is enabled (e.g., whether the protected frame is required, whereby an unprotected frame would be discarded; or whether the unprotected frame may be acceptable). In addition, the extended capabilities element can include a third bit indicating that the access point supports a protected keep-alive frame (e.g., a keep alive frame to maintain the L2 connectivity is to be protected) and a fourth bit indicating whether the keep-alive capability is enabled for protected frames only or not (e.g., whether the protected frame is required, whereby an unprotected keep-alive frame would be discarded; or whether the unprotected frame may be acceptable). Further, the extended capabilities element can include a fifth bit indicating whether an association with the computing device 220, as part of establishing a data connection, is permitted based on a use of protected frames by the computing device (e.g., that the association can be established and, thus, the data connection can be established only when the computing device 220 supports the protected power management mode and/or a protected keep-alive mode). An example of such an extended capabilities element is shown in the illustrative Table 1 below.

TABLE 1

| Bit | Information | Notes |
|---|---|---|
| N | Protected Power Management Mode Supported | When set to "1," access point and computing device allow protected frames to be used for Power Management transition purpose. When set to "0," access point or computing device may allow (QoS) Null or other un-protected data management frames for Power Management transition purpose. |
| N +1 | Protected Power Management Mode Enabled | When set to "1," access point does not allow unprotected frames such as (QoS) Nulls, from the computing device that has "Protected Power Management Mode Enabled" set to "1," to be used for Power Management transition purpose. When not present or set to "0" in either access point or computing device, unprotected frames may be used by computing devices for Power Management transition purpose. |
| N + 2 | Protected Keep-Alive Mode Supported | When set to "1," access point and computing device support Protected Keep Alive frames to maintain L2 connectivity. When set to "0," devices may use unprotected frames like QoS Null for keep alive purposes. |
| N + 3 | Protected Keep-Alive Mode Enabled | When set to "1," access point only allows Protected Keep Alive frames, from the computing device that has "Protected Keep-Alive Mode Enabled" set to "1", to maintain L2 connectivity. When set to "0," devices may use unprotected frames like QoS Null for keep alive purposes. |
| N + 4 | Protected Power Management Mode Required to Establish Association | When set to "1" on the access point, access point does not allow a computing device that has either "Protected Power Management Enabled" set to "0" or missing, to associate with this access point. When set to "0," access point allows computing device to associate with this access point irrespective of their protected power management capability. |

The vendor specific element can include similar information in a vendor specific content field. For example, the above five bits can be included in sub-fields of the vendor specific content field within the vendor specific element. In an illustration, the vendor specific element includes multiple fields as shown the illustrative Table 2 below.

TABLE 2

| Element ID | Length | Information field | |
|---|---|---|---|
| 221 | n | organizationally unique identifier (OUI) | Vendor-specific content |

In Table 2, the element ID field is one octet. The length field is one octet. The OUI field is three octets. And the vendor specific content field is three octets.

The vendor specific content includes the above information in sub-fields as shown the illustrative Table 2 below.

TABLE 3

| Protocol Specific content [type-length-values (TLVs)] (2) | | |
|---|---|---|
| ID (1) | Sub-ID | Description |
| | 4 | Protected Power Management Mode Supported. When set to "1," access point and computing device allow protected frames to be used for Power Management transition purpose. When set |

TABLE 3-continued

Protocol Specific content [type-length-values (TLVs)] (2)

| ID (1) | Sub-ID | Description |
|---|---|---|
| | | to "0," access point or computing device may allow (QoS) Null or other un-protected data management frames for Power Management transition purpose. |
| | 5 | Protected Power Management Mode Enabled. When set to "1," access point does not allow unprotected frames such as (QoS) Nulls, from the computing device that has "Protected Power Management Enabled" set to "1," to be used for Power Management transition purpose. When not present or set to "0" in either access point or computing device, unprotected frames may be used by computing devices for Power Management transition purposes. |
| | 6 | Protected Keep-Alive Mode Supported. When set to "1", access point and computing device support Protected Keep Alive frames to maintain L2 connectivity. When set to "0," devices may use unprotected frames like QoS Null for keep alive purposes. |
| | 7 | Protected Keep-Alive Mode Enabled. When set to "1," access point only allows Protected Keep Alive frames, from the computing device that has "Protected Keep-Alive Enabled" set to "1," to maintain L2 connectivity. When set to "0," devices may use unprotected frames like QoS Null for keep alive purposes. |
| | 8 | Protected Power Management Mode Required to Establish Association. When set to "1" on the access point, access point does not allow a computing device that has either "Protected Power Management Enabled" set to "0" or missing, to associate with this access point. When set to "0," access point allows computing device to associate with this access point irrespective of their protected power management capability. |

Under the first stage 201, the computing device 220 can also send a frame indicating a request for the capability. For instance, this request can be sent in a frame and can indicate whether the protected power management mode is supported by the computing device 220, whether the protected power management mode is enabled by the computing device 220, whether the protected keep-alive mode is supported by the computing device 220, whether the protected keep-alive mode is enabled by the computing device 220, and/or whether the protected power management mode and/or the protected keep-alive mode are required to establish an association with the computing device 220. The frame can be any of a probe request frame, an authentication request frame, or an association request frame. Similarly to the frame of the access point 210, here the frame can include an extended capabilities element and/or a vendor specific element in the MAC header. The vendor specific element can also be added to TDLS, IBSS, MBSS Beacons and Management frames.

Upon receiving the request from the computing device 220, the access point 210 can generate and store protected power management data 212. The protected power management data 212 is usable as part of processing requests received by the access point 210 and indicating that the computing device 220 is transitioning into the power save mode or out of the power save mode. The protected power management data 212 can include an identifier of the computing device 220 (e.g., the MAC address) and the above bits, each set to "0" or "1" for the access point 210 and/or for the computing device 220 according to the capability advertised by the access point 210 and the capability requested by the computing device 220.

Although FIG. 2 illustrates that the first stage 201 includes the access point 210 advertising its capability and the computing device 220 requesting the capability, the embodiments of the present disclosure are not limited as such. For example, the access point 210 can advertise the capability, but the computing device 220 need not request it. Instead, the computing device 220 can use protected frames based on a determination that the access point 210 provides the capability of the protected power management mode. In another example, the access point may not advertise the capability, but the computing device 220 may request it. In this example, the access point 210 can generate and store the protected power management data 212 upon receipt of a frame from the computing device 220 requesting the capability. In yet another example, the access point 210 does not advertise the capability and the computing device 220 does not request it. Instead, each of such devices can be configured to support and/or enable the protected power management mode before and/or after a data connection being established between the two devices.

During the second stage 202, the computing device 230 sends data to the access point 210 indicating that the computing device 230 has entered the power save mode or has exited the power save mode. The data can be sent as a frame with a power management bit set to "1" or "0" for entering or leaving, respectively, the power mode and the access point 210 may respond with an acknowledgment to the computing device 230. In particular, the power management bit can be set in a frame control within a MAC header of the frame. In one example, this frame can be a protected data frame or a protected management frame including, for instance, a checksum and an encrypted payload that in turn includes AAD generated based on the MAC header. In this example, the access point 210 processes the protected frame by authenticating the protected frame according to the checksum, decrypting the payload, authenticating the MAC header according to the AAD, and retrieving the value of the power management bit. The access point 210 generates or updates power save data 214 to indicate the power save mode. The power save data 214 can include an identifier of the computing device 220, such as its MAC address, and a bit to have the same value as the power management bit. In another example, the frame received from the computing device 220 may be an unprotected frame. The access point 210 can determine whether to update the power save mode data 214 given the unprotected frame based on a determination of whether the protected power management data 212 restricts or permits the update. This determination depends on how the values of the bits set in the protected power management data 212 for the computing device 220. If restricted, the access point 210 can discard the power management bit included in the unprotected bit, thereby effectively ignoring the indication about the power save mode transition. If permitted, the access point 210 updates the power save mode data 214 to indicate the power save mode indicated by the unprotected frame.

During the third stage 203, the access point 210 receives frames 216, such as data frames and/or management frames. Each of the frames 216 include a MAC header that, in turn, includes the MAC address of the computing device 220 as the receiver address. Accordingly, the access point 210 determines that the frames 216 are addressed to the computing device 220. The access point 210 uses the MAC address to look-up the power save mode data 214 and generate a decision 217 of whether the frames 216 should be immediately transmitted to the computing device 220 or stored in a memory buffer for a delayed transmission. In particular, if the computing device 220 is out of the power save mode, the frames 216 are transmitted 218 without being buffered. If the computing device 220 is in the power save mode, the frames 216 are buffered and the transmission of the buffered frames is delayed 219 until the computing device 220 exits the power save mode (or until a time out time duration, after which the buffered frames 216 are deleted and not transmitted).

Figure 3:
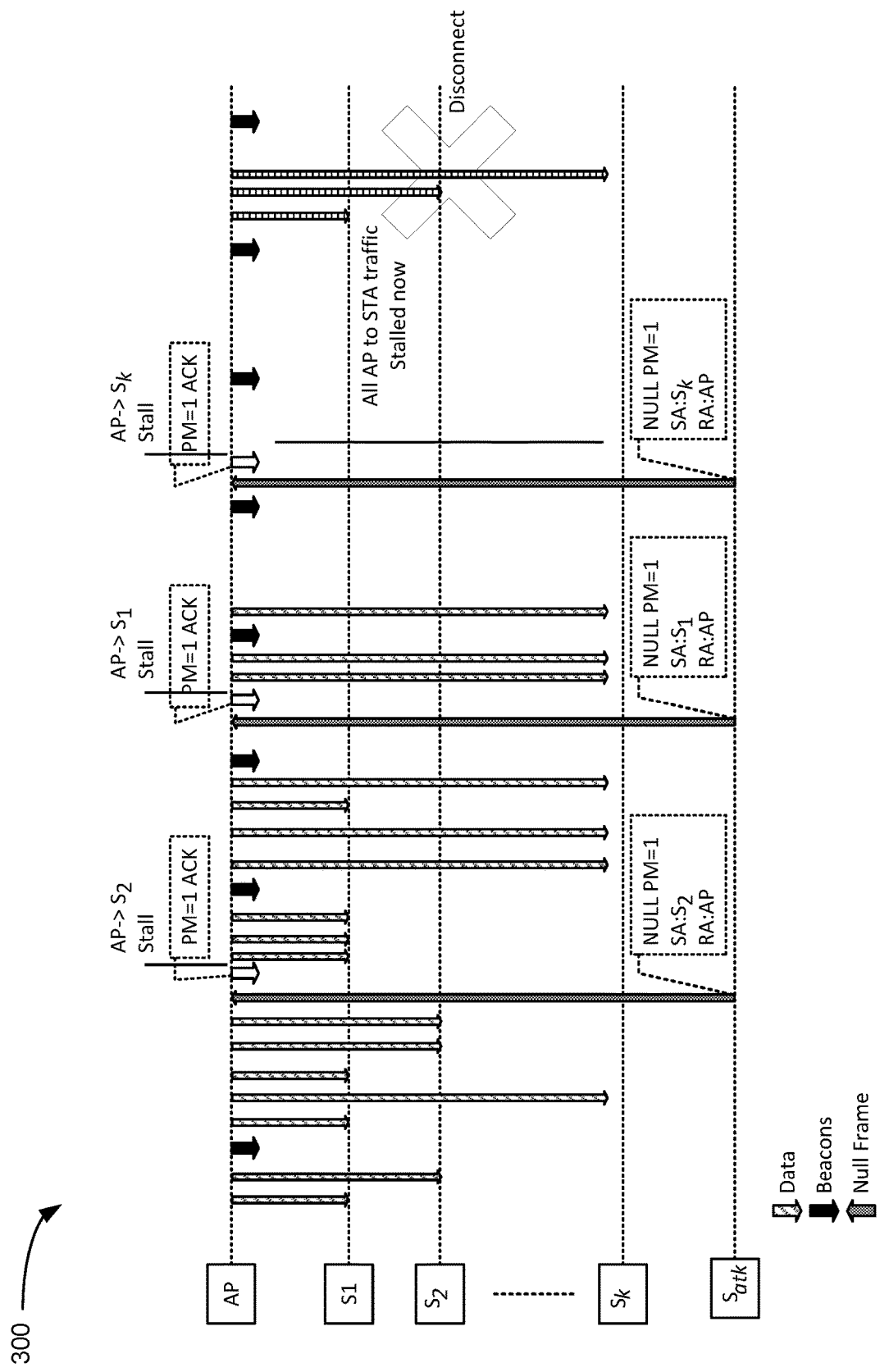
FIG. 3 illustrates an unprotected power management mode available to a computing device that enters a power save mode.

FIG. 3 illustrates an unprotected power management mode 300 available to a computing device that enters a power save mode. When operating in the unprotected power management mode 300, an access point and a computing device exchange data, whereby the computing device can use an unprotected frame to indicate a transition associated with a power save mode and the access point can manage frames destined to the computing device based on the unprotected frame (e.g., immediate transmission if the indication is for being out of the power save mode and delayed transmission if the indication is for being in the power save mode).

Generally, the power save mode allows the computing to conserve power and do frame exchanges with the access point at selected predefined times. When the access point receives a frame from the computing device with power management bit set to "1," the access point starts buffering the traffic and schedules the transmission upon receiving a trigger frame (a null frame, ps-poll frame, or any other frame with a power management bit set to "0") from the computing device. The power management bit of "1" informs the access point that the computing device is out of the power save mode and can receive traffic.

Even with a security protocol in use, such as WPA3 security, a computing device may use an unprotected data or management frame to tell the access point that it is going in and out of power save mode. Any wireless device, which may be outside of the computer network, can send a spoofed, unprotected frame with a power management bit set to "1" with a spoofed source MAC address corresponding to another computing device on the computer network, forcing the access point to start buffering traffic for the other computing device that is not currently in the power save mode, causing delays and in some cases disconnects, as further illustrated in FIG. 3. In another example, when an actual computing device is in the power save mode, an attacker can send a spoofed, unprotected frame with a source MAC address of the actual computing device and a power management bit set to "0," which would trick the access point to recognize that the actual computing device has exited the power save mode and the access point can start sending traffic to the actual computing device, which might still be in the power save mode and would not send an acknowledgement (e.g. ACK data), as further illustrated in FIG. 4. Failure to receive consecutive acknowledgements may necessitate the access point to disconnect the actual computing device. The attacker does not need to be in the same network and does not need complex hardware or software to send spoofed, unprotected frames with targeted power management bits.

As illustrated in FIG. 3, an access point "AP" is communicatively coupled with "k" computing devices, shown as stations "$S_1$," "$S_2$," . . . , "$S_k$." The access point AP and the stations $S_1, S_2, \ldots, S_k$ form a basic service set. An attacker can use an attacker station "$S_{atk}$" to spoof the access point AP. The attacker station $S_{atk}$ can, but need not, be part of the basic service set.

The attacker station $S_{atk}$ spoofs the actual device MAC addresses of the stations $S_1, S_2, \ldots S_k$ and tricks the access point AP to recognize that these stations $S_1, S_2, \ldots, S_k$ are in a power save mode. Traffic to these stations $S_1, S_2, \ldots S_k$ would be resumed only if these stations send some frame with power management bit set to "1" to the access point AP. For downlink only traffic this adds lots of delay as the access point AP would only deliver traffic when it receives either a ps-poll frame (which would not be the case as an actual station (e.g., any of the stations $S_1, S_2, \ldots S_k$) is not in sleep mode), or a frame with power management bit set to "1." In the worst case, the access point AP can disconnect an actual station, when it does not receive such uplink frame from the actual station and may run out of memory space due to excessive buffering.

As shown in the illustration, the access point AP sends data frames when received and beacon frames at predetermined intervals to the stations $S_1, S_2, \ldots S_k$. $S_1, S_2, \ldots S_k$. At a first point in time, the attacker station $S_{atk}$ sends a spoofing null frame with a source address set to the MAC address of the station $S_2$, a receiver address set to the MAC address of the access point AP, and a power management bit set to "1" in the MAC header. The access point AP responds with an ACK. From that point on, frames that the access point AP receives and that are addressed to the station $S_2$ are buffered, rather being immediately transmitted. Over time, if the there is no change to this spoofed power save mode of the station $S_2$, the access point AP can run out of memory space for the buffering and can disconnect the station $S_2$.

Similarly, at other points in time, the attacker station $S_{atk}$ sends spoofing null frames, each with a source address set to the MAC address of the station $S_1$ or the station $S_k$, a receiver address set to the MAC address of the access point AP, and a power management bit set to "0" in the MAC header. The access point AP responds with ACKs. Subsequently, frames that the access point AP receives and that are addressed to the station $S_1$ or the station $S_k$ are buffered as applicable, rather being immediately transmitted. Over time, if there is no change to this spoofed power save mode of the station $S_1$ or the station $S_k$, the access point AP can run out of memory space for the buffering and can disconnect the station $S_1$ or the station $S_k$.

Hence, the unprotected power management mode 300 may allow the attacker station $S_{atk}$ to delay frame transmissions to stations $S_1, S_2, \ldots S_k$, thereby degrading the reliability of such transmissions. In addition, the attacker station $S_{atk}$ can also cause the access point AP to disconnect the stations $S_1, S_2, \ldots S_k$, further degrading the reliability.

Figure 4:
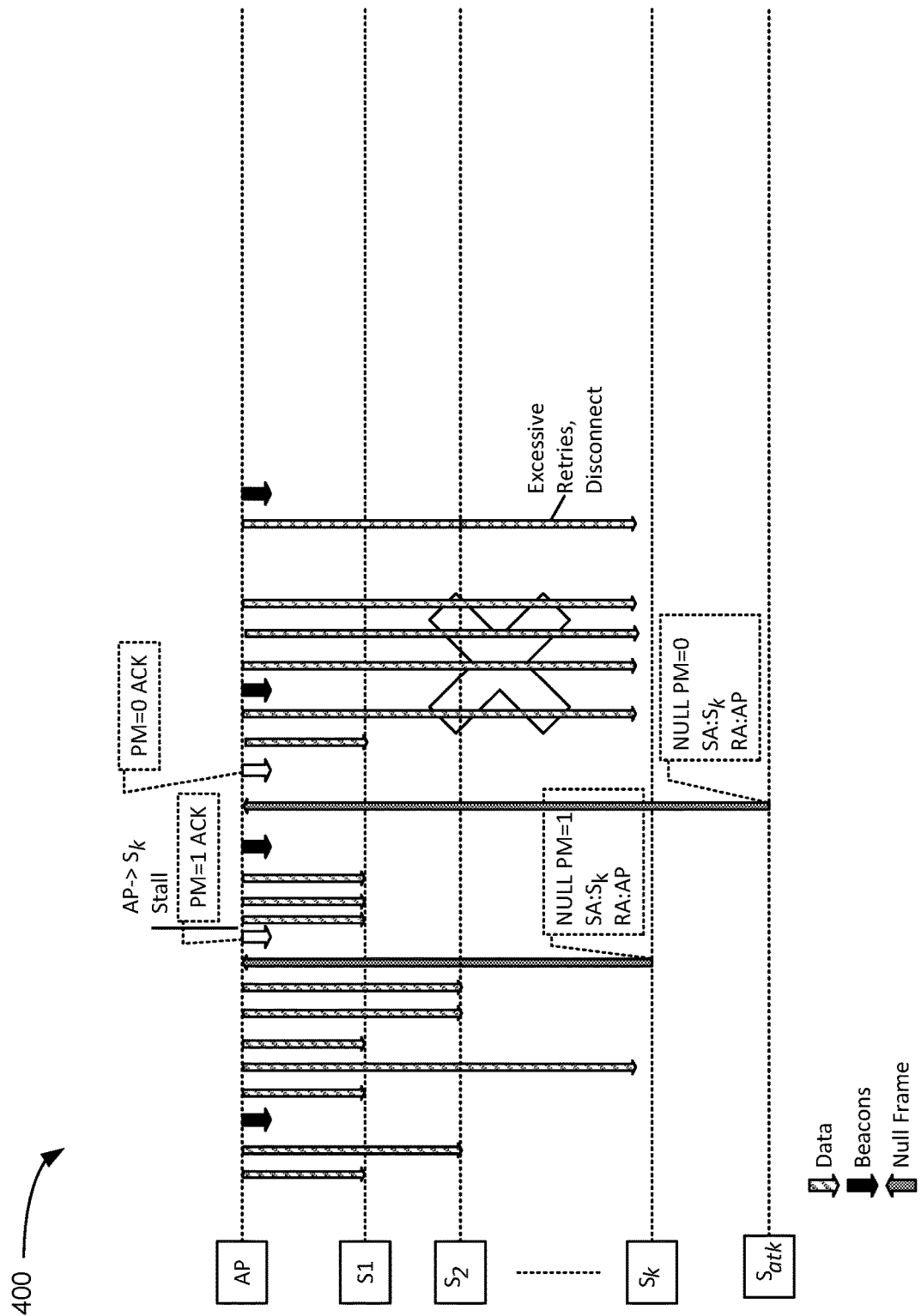
FIG. 4 illustrates an unprotected power management mode available to a computing device that exits a power save mode.

FIG. 4 illustrates an unprotected power management mode 400 available to a computing device that exits a power save mode. Here, an attacker tricks an access point to incorrectly determine that a computing device in a power save mode has transitioned out of the power save mode by sending spoofing, unprotected frame, such as a QoS null frame with a power management bit set to "0." In this case, the access point receives this frame, determines that the computing device has transitioned out of the power save mode, and starts sending buffered data and newly received data to the computing device. Since the device may still be in the power save mode, the computing device fails to receive the transmitted data and does not send any acknowledgements. Upon missing consecutive acknowledgements, the access point can disconnect the computing device.

As illustrated in FIG. 4, an access point "AP" is communicatively coupled with "k" computing devices, shown as stations "$S_1$," "$S_2$," . . . , "$S_k$." The access point AP and the stations $S_1, S_2, \ldots, S_k$ form a basic service set. An attacker can use an attacker station "$S_{atk}$" to spoof the access point AP. The attacker station $S_{atk}$ can, but need not, be part of the basic service set.

In an example, the access point AP sends data frames when received and beacon frames at predetermined intervals to the stations $S_1$, $S_2$, . . . $S_k$ when these stations are out of the power save mode. At a first point in time, one of the stations, such as the station $S_k$ transitions to the power save mode and sends a null frame with a source address set to the MAC address of the station $S_k$, a receiver address set to the MAC address of the access point AP, and a power management bit set to "1" in the MAC header. The access point AP determines that the station $S_k$ has entered the power save mode and responds with an ACK. Data frames received thereafter and destined to the station $S_k$ are buffered until the station $S_k$ exits the power save mode.

Subsequently, the attacker station $S_{atk}$ sends a spoofing null frame with a source address set to the MAC address of the station $S_k$, a receiver address set to the MAC address of the access point AP, and a power management bit set to "0" in the MAC header. The access point AP responds with an ACK. Accordingly, the access point AP determines that the station $S_k$ is out of the power save mode, when it actually is not. From that point on, buffered frames addressed to the station $S_k$ and new frames that the access point AP receives and that are addressed to the station $S_k$ are immediately transmitted to the station $S_k$. Because the station $S_k$ may still be in the power save mode, the access point AP does not receive acknowledgements from the station $S_k$ and, as a result, can disconnect the station $S_k$.

Hence, the unprotected power management mode 400 may allow the attacker station $S_{atk}$ to cause a transmission of frames to stations $S_1$, $S_2$, . . . $S_k$, when the stations are in the power save mode and not capable of receiving the frames, thereby degrading the reliability of such transmissions. In addition, the attacker station $S_{atk}$ can also cause the access point AP to disconnect the stations $S_1$, $S_2$, . . . $S_k$, further degrading the reliability.

Figure 5:
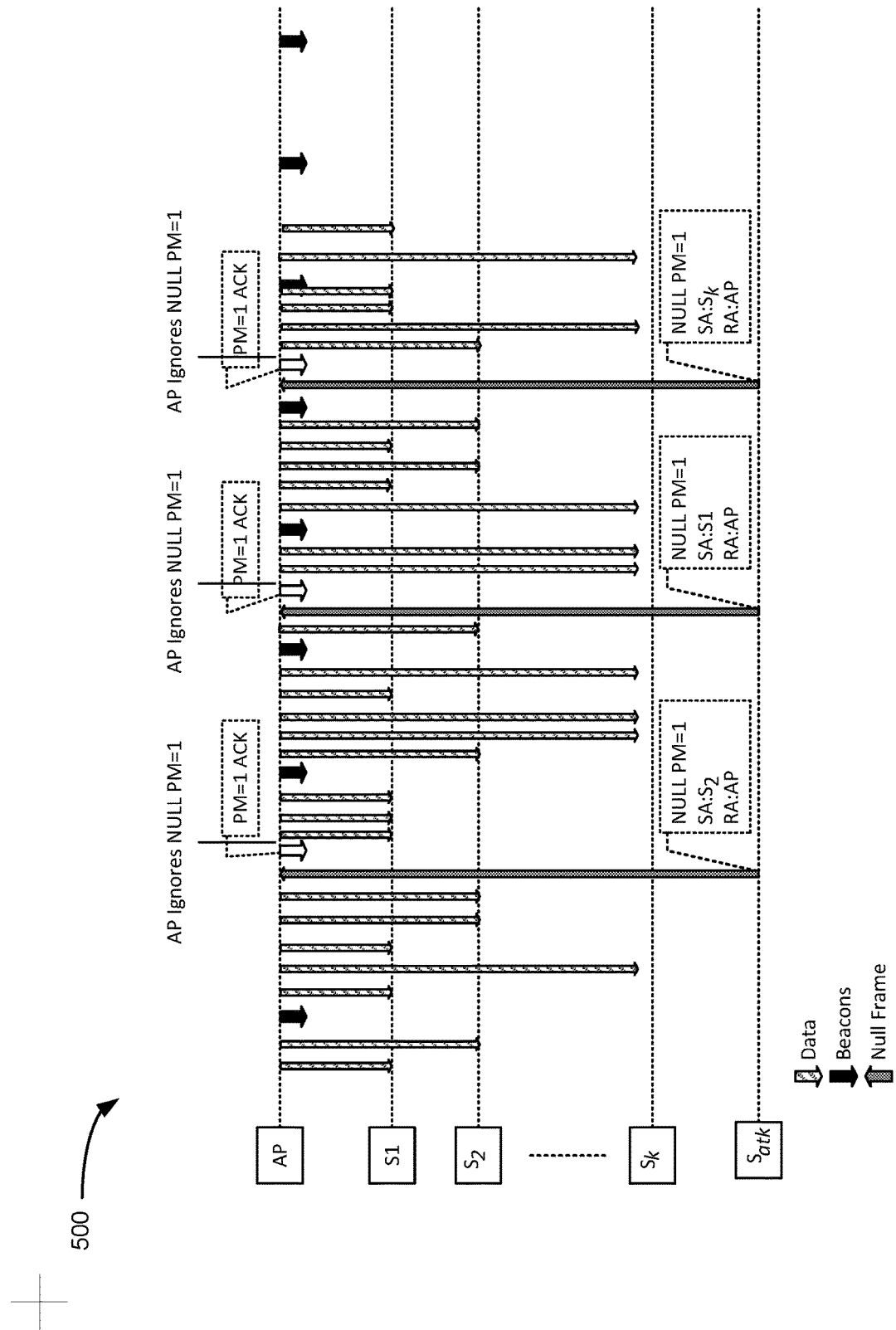
FIG. 5 illustrates a protected power management mode available to a computing device that enters a power save mode according to an embodiment of the present disclosure.

FIG. 5 illustrates a protected power management mode 500 available to a computing device that enters a power save mode according to an embodiment of the present disclosure. As explained herein above and in an example, the protected power management mode 500 supports the capability by which an access point can allow computing devices to use only protected frames (e.g., encrypted and/or authenticated frames) for power management purposes. When the access point and a computing device both support the protected power management mode 500, the access point can ignore any received unprotected frame for power management purposes. The computing device can use any pending data or management frame that would be encrypted to include the appropriate power management bit. When no such data or management frame available, the computing device can use, for instance, an ARP frame to include the appropriate power management bit. Because protected frames are used for indicating the power management mode (e.g., encrypted with a key shared between the access point and the computing device, and/or including authentication data to indicate tampering), the capability of an attacker to spoof the access point is significantly degraded.

As illustrated in FIG. 5, an access point "AP" is communicatively coupled with "k" computing devices, shown as stations "$S_1$," "$S_2$," . . . , "$S_k$." The access point AP and the stations $S_1$, $S_2$, . . . , $S_k$ form a basic service set and have enabled the use of the protected power management mode 500. An attacker can use an attacker station "$S_{atk}$" to attempt spoofing the access point AP. The attacker station $S_{atk}$ can, but need not, be part of the basic service set.

In an example, the access point AP sends data frames when received and beacon frames at predetermined intervals to the stations $S_1$, $S_2$, . . . $S_k$. These stations $S_1$, $S_2$, . . . $S_k$. are out of the power save mode. At a first point in time, the attacker station $S_{atk}$ sends a spoofing null frame with a source address set to the MAC address of the station $S_2$, a receiver address set to the MAC address of the access point AP, and a power management bit set to "1" in the MAC header. The access point AP responds with an ACK. However, because the null frame is unprotected (e.g., does not include an encrypted payload that in turn includes AAD and/or does not include a checksum), the access point AP ignores this null frame. Frames received thereafter by the access point AP and addressed to the station $S_2$ are transmitted immediately, rather than being buffered.

Similarly, at other points in time, the attacker station $S_{atk}$ sends spoofing null frames each with a source address set to the MAC address of the station $S_1$ or the station $S_k$, a receiver address set to the MAC address of the access point AP, and a power management bit set to "0" in the MAC header. The access point AP responds with ACKs and ignores these unprotected frames. Subsequently, frames that the access point AP receives and that are addressed to the station $S_1$ or the station $S_k$ are transmitted immediately as applicable, rather being buffered.

Hence, the protected power management mode 500 significantly reduces the risk of the attacker station $S_{atk}$ to delay frame transmissions to stations $S_1$, $S_2$, . . . $S_k$, thereby improving the reliability of such transmissions and potentially avoiding any improper disconnects.

Figure 6:
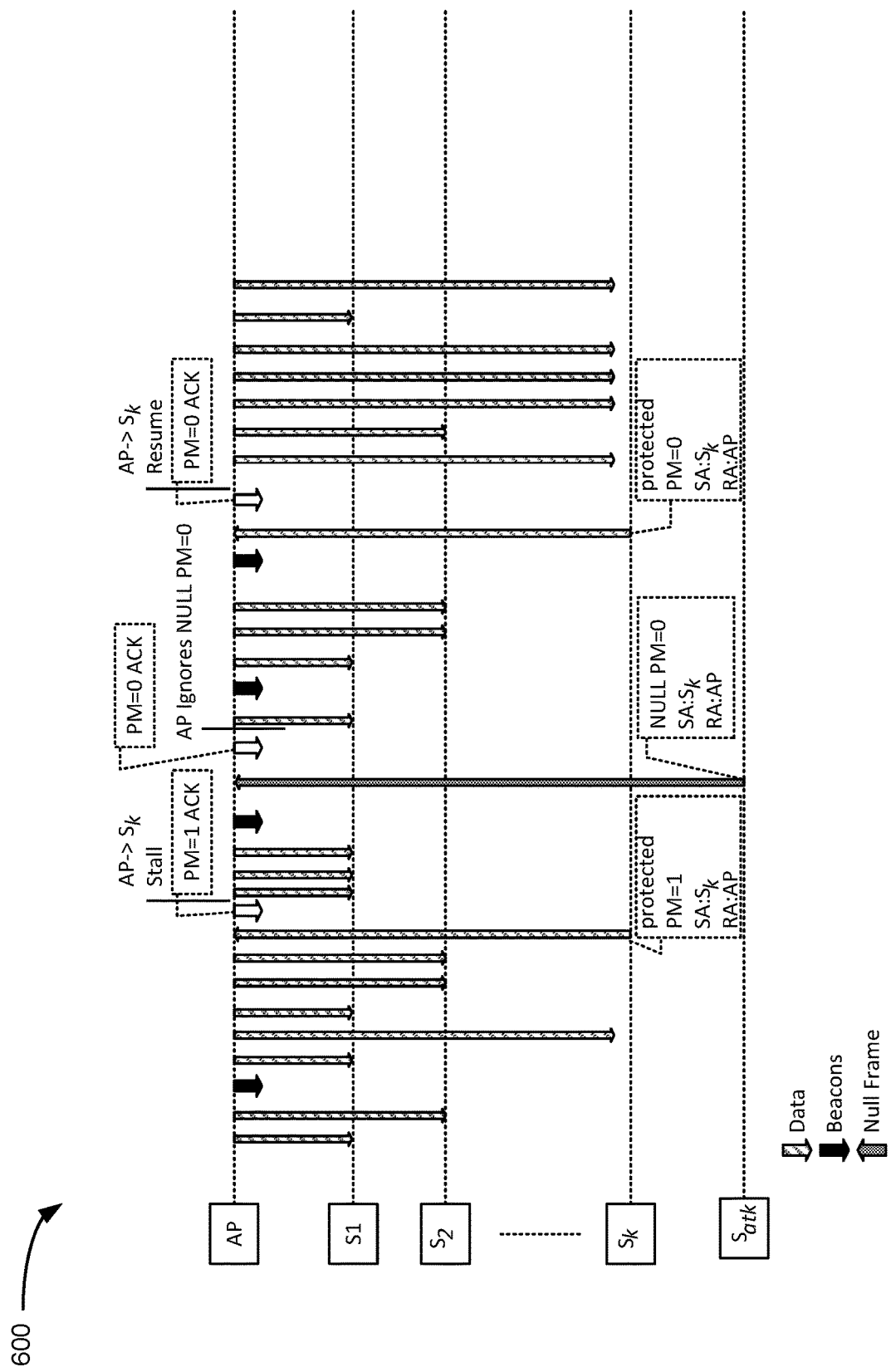
FIG. 6 illustrates a protected power management mode available to a computing device that exits a power save mode according to an embodiment of the present disclosure.

FIG. 6 illustrates a protected power management mode 600 available to a computing device that exits a power save mode according to an embodiment of the present disclosure. Here, an attacker attempt to trick an access point to recognize that a computing device in a power save mode has transitioned out of the power save mode by sending a spoofing, unprotected frame, such as a QoS null frame with a power management bit set to "0." In this case, the access point receives this frame, determines that it is unprotected or its protection is improper (e.g., the decryption fails and/or the authentication fails), and accordingly ignores the unprotected frame. Thereby, the attacker's spoofing attempt fails.

As illustrated in FIG. 6, an access point "AP" is communicatively coupled with "k" computing devices, shown as stations "$S_1$," "$S_2$," . . . , "$S_k$." The access point AP and the stations $S_1$, $S_2$, . . . , $S_k$ form a basic service set and have enabled the use of the protected power management mode 600. An attacker can use an attacker station "$S_{atk}$" to attempt spoofing the access point AP. The attacker station $S_{atk}$ can, but need not, be part of the basic service set.

In an example, the access point AP sends data frames when received and beacon frames at predetermined intervals to the stations $S_1$, $S_2$, . . . $S_k$ when these stations are out of the power save mode. At a first point in time, one of the stations, such as the station $S_k$ transitions to the power save mode and sends a protected frame with a source address set to the MAC address of the station $S_k$, a receiver address set to the MAC address of the access point AP, and a power management bit set to "1" in the MAC header. Because this frame is properly protected, the access point AP determines that the station $S_k$ has entered the power save mode and responds with an ACK. Data frames received thereafter and destined to the station $S_k$ are buffered until the station $S_k$ exits the power save mode.

Subsequently, the attacker station $S_{atk}$ sends a spoofing null frame with a source address set to the MAC address of the station $S_k$, a receiver address set to the MAC address of the access point AP, and a power management bit set to "0" in the MAC header. The access point AP responds with an ACK. However, because the null frame is unprotected (e.g., does not include an encrypted payload that in turn includes AAD and/or does not include a checksum), the access point AP ignores this null frame. Already buffered frames addressed to the station $S_k$ are not transmitted to the station $S_k$ and newly received frames addressed to the $S_k$ are buffered.

At a later point in time, the station $S_k$ transitions out of the power save mode and sends a protected frame with a source address set to the MAC address of the station $S_k$, a receiver address set to the MAC address of the access point AP, and a power management bit set to "0" in the MAC header. Because this frame is properly protected, the access point AP determines that the station $S_k$ has exited the power save mode and responds with an ACK. Already buffered frames addressed to the station $S_k$ and newly received frames addressed to the $S_k$ are transmitted immediately to the station $S_k$.

Hence, the protected power management mode 600 significantly reduces the risk of the attacker station $S_{atk}$ causing a transmission of frames to stations $S_1, S_2, \ldots S_k$, when the stations are in the power save mode and not capable of receiving the frames, thereby improving the reliability of such transmissions.

In the above illustrations of FIGS. 5-6, the use of protected frames for power management is described. This use of protected frames can extend for other management purposes beyond power management. For example, a computing device that is mostly idle can use keep-alive frames to maintain the L2 connectivity. Otherwise, the access point may determine a period of inactivity and may disconnect the device. If such frames are unprotected, an attacker may spoof the access point, similarly to the description of FIGS. 3 and 4. However, if the frames are protected, the risk of spoofing is significantly reduced, as described in connection with FIGS. 5 and 6. Accordingly, protected keep-alive frames can be used, thereby allowing an access point to reliably determine whether an idle computing device is actually alive or not.

Figure 7:
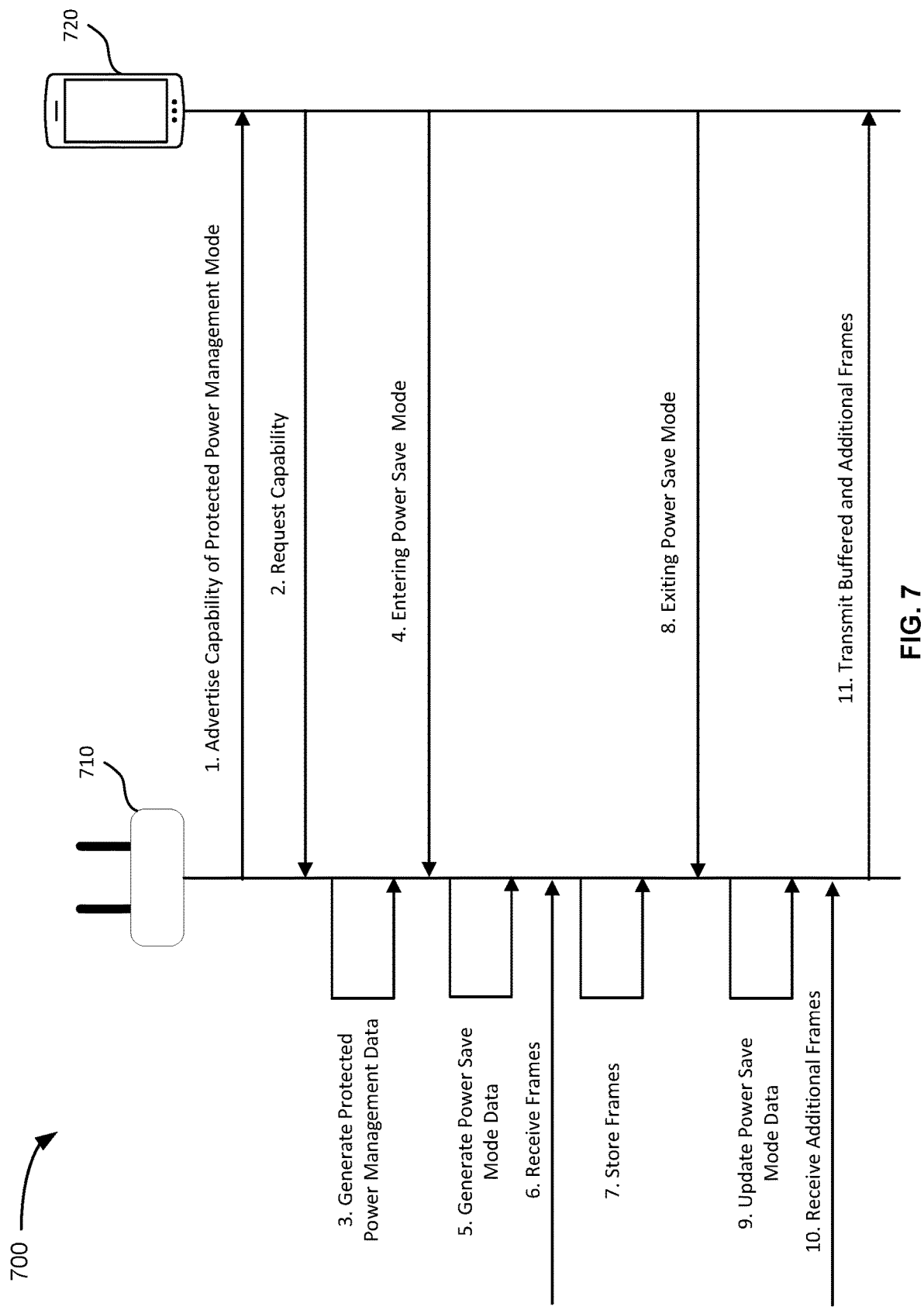
FIG. 7 illustrates an example sequence diagram for using a protected power management mode according to an embodiment of the present disclosure.

FIG. 7 illustrates an example sequence diagram 700 for using a protected power management mode according to an embodiment of the present disclosure. As illustrated, the sequence diagram 700 includes a plurality of sequence steps performed by an access point 710 and a computing device 720 that are communicatively coupled. The access point 710 and the computing device are examples of the access point 210 and the computing device 220, respectively, of FIG. 2.

As illustrated, in a first sequence step of the sequence diagram 700, the access point 710 advertises its capability of utilizing the protected power management mode. In an example, advertising the capability includes transmitting one or more frames indicating whether the access point 710 supports the protected power management mode, whether the access point 710 has enabled the protected power management mode, and/or whether the access point 710 necessitates a computing device to have also enabled the protected power management mode for an association to be established between the access point 710 and the computing device as part of establishing a data connection. Such indications can be set as bits in an extended capabilities element and/or a vendor specific element within the frame. Similarly, the access point 710 can advertise its capability for other types of protected modes, such as a protected keep-alive mode by including the relevant bits in the extended capabilities element and/or the vendor specific element.

In a second step of the sequence diagram 700, the computing device 720 requests the capability. In an example, the computing device transmits a frame that includes an extended capabilities element and/or a vendor specific element. Any or a combination of the elements include bits indicating whether the computing device 720 supports the protected power management mode, whether the computing device 720 has enabled the protected power management mode, and/or whether the computing device 720 necessitates an access point to have enabled the protected power management mode for an association to be established between the computing device 720 and the access point as part of establishing a data connection. Similarly, the computing device 720 can request other types of protected modes, such as a protected keep-alive mode by including the relevant bits in the extended capabilities element and/or the vendor specific element.

In a third step of the sequence diagram 700, the access point 710 generates protected power management data. In an example, the protected power management data associates the computing device 720 with the protected power management mode (and any other protected mode as applicable). For instance, the protected power management data includes a MAC address of the computing device 720 and a set of bits indicating how the protected power management mode is applicable to the MAC address (e.g., these bits can be the bits sent and/or received in the extended capabilities elements and/or vendor specific elements).

In a fourth step of the sequence diagram 700, the computing device 720 sends data indicating a transition to a power save mode. In an example, the computing device 720 sends a protected frame that includes a power management bit set to "1."

In a fifth step of the sequence diagram 700, the access point 710 generates power save mode data. In an example, the power save mode data associates the computing device 720 with the power save mode. For instance, the power save mode data includes the MAC address of the computing device 720 and a bit set to have the same value as the power management bit. The access point 710 verifies the protected frame (e.g., decrypts and/or authenticates the protected frame). Upon a successful verification, the access point 710 determines that the power management bit is set to "1."

In a sixth step of the sequence diagram 700, the access point 710 receives frames. In an example, the frames include the MAC address of the computing device 720 as the receiver address. Accordingly, the access point 710 determines that the frames are addressed to the computing device 720. The access point 710 uses the MAC address to look up the power save mode data and determines that the computing device 720 is in the power save mode.

In a seventh step of the sequence diagram 700, the access point 710 stores the frames in a memory buffer. In particular, because the computing device 720 is in the power save mode, the access point 720 buffers the frames until, potentially, the computing device 720 exits the power save mode.

In an eighth step of the sequence diagram 700, the computing device sends data indicating a transition out of the power save mode. In an example, the computing device 720 send a protected frame that includes a power management bit set to "0."

In a ninth step of the sequence diagram 700, the access point 710 updates the power save mode data. In an example, the access point 710 verifies the protected frame (e.g., decrypts and/or authenticates the protected frame). Upon a successful verification, the access point 710 determines that the power management bit is set to "0," looks up the power save mode data by using the MAC address of the computing device 720, and updates the corresponding bit to also have the value of "0."

In a tenth step of the sequence diagram 700, the access point 710 receives additional frames. In an example, the additional frames include the MAC address of the computing device 720 as the receiver address. Accordingly, the access point 710 determines that the additional frames are addressed to the computing device 720. The access point 710 uses the MAC address to look up the power save mode data and determines that the computing device 720 is out the power save mode.

In an eleventh step of the sequence diagram 700, the access point 710 transmits, to the computing device 720, the additional frames and the frames that were buffered for the computing device 720.

Figure 8:
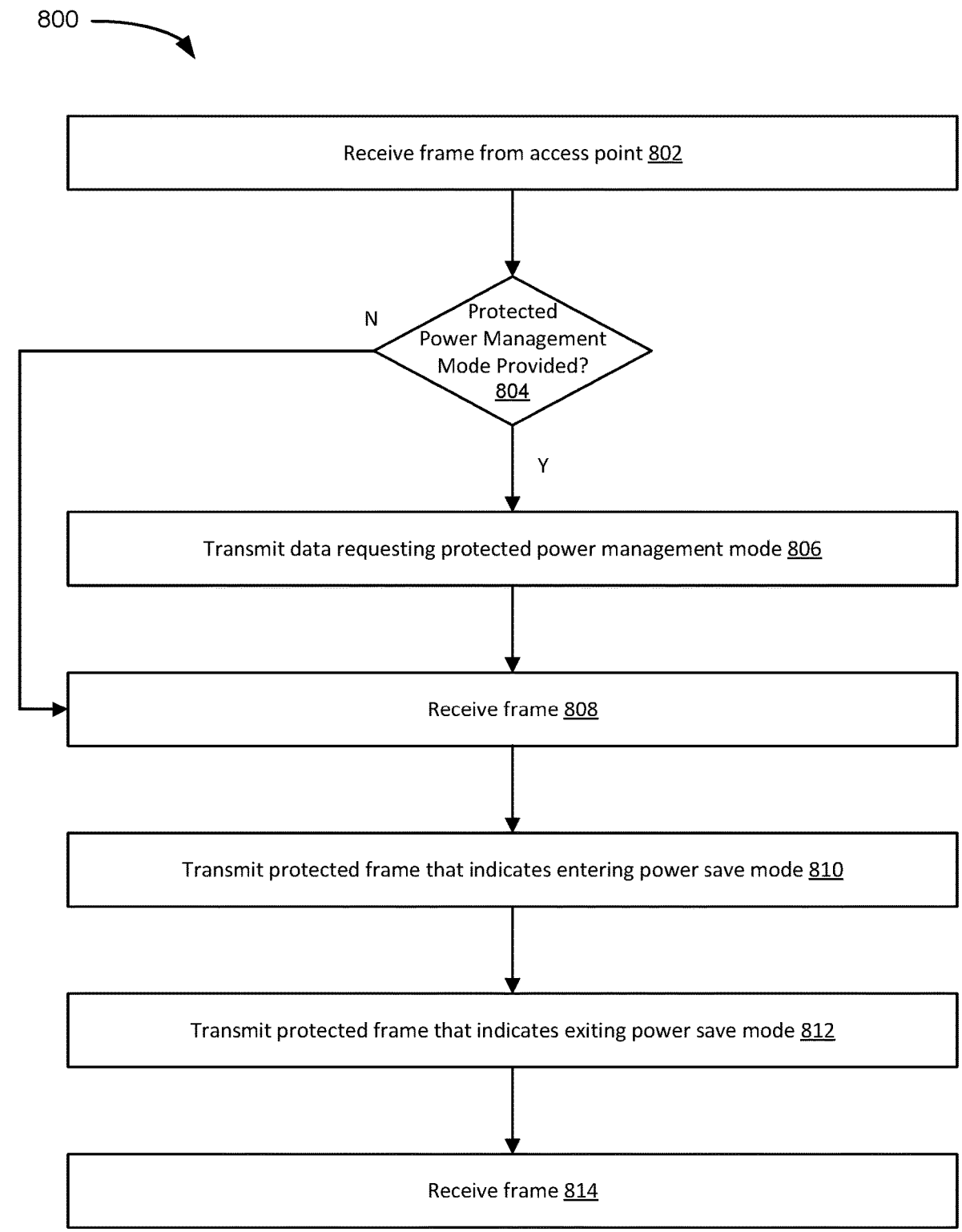
FIG. 8 illustrates an example flow of a computing device requesting a protected power management mode according to an embodiment of the present disclosure.
Figure 9:
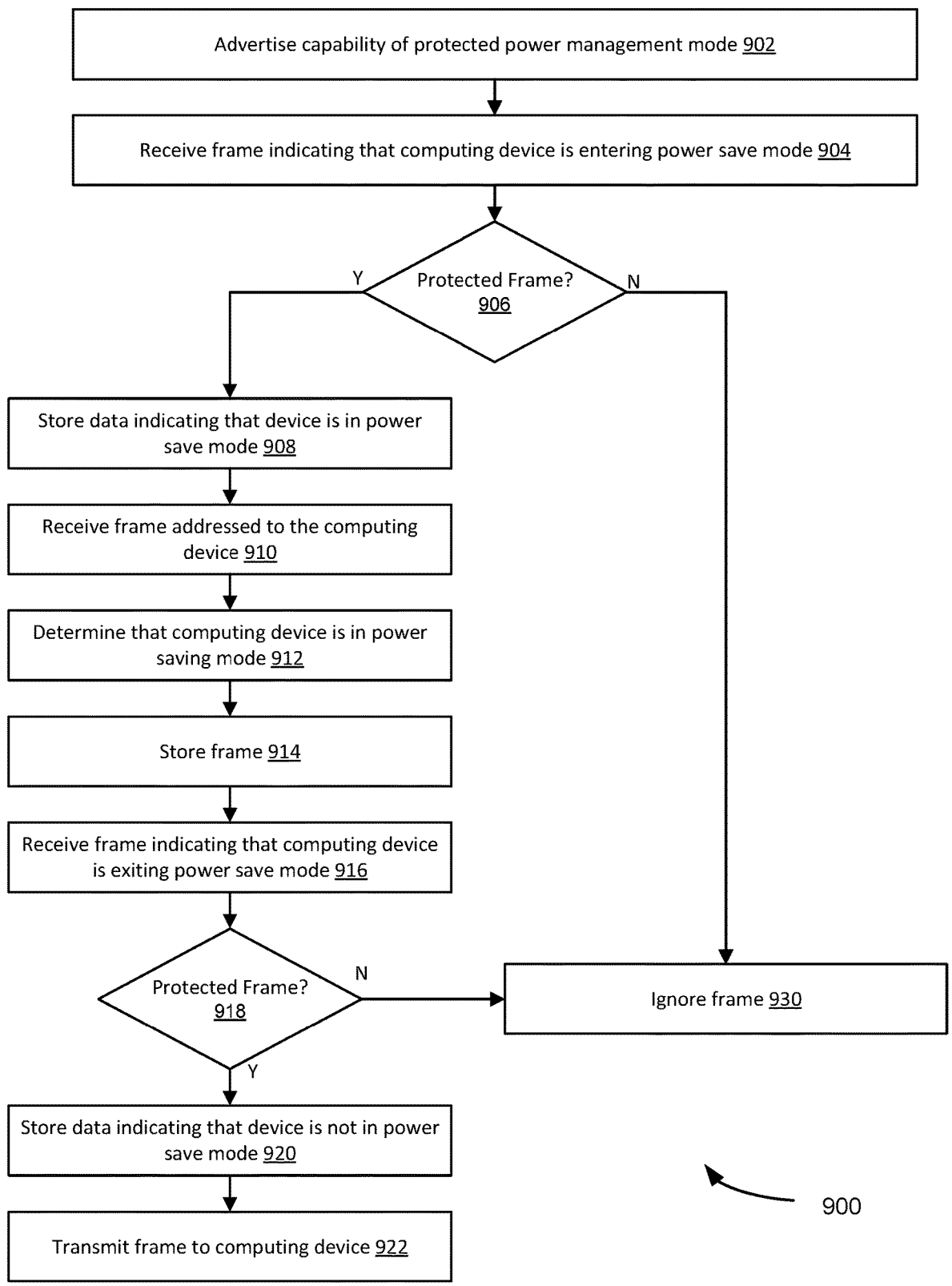
FIG. 9 illustrates an example flow of an access point managing transmission of frames based on a protected power management mode according to an embodiment of the present disclosure.
Figure 10:
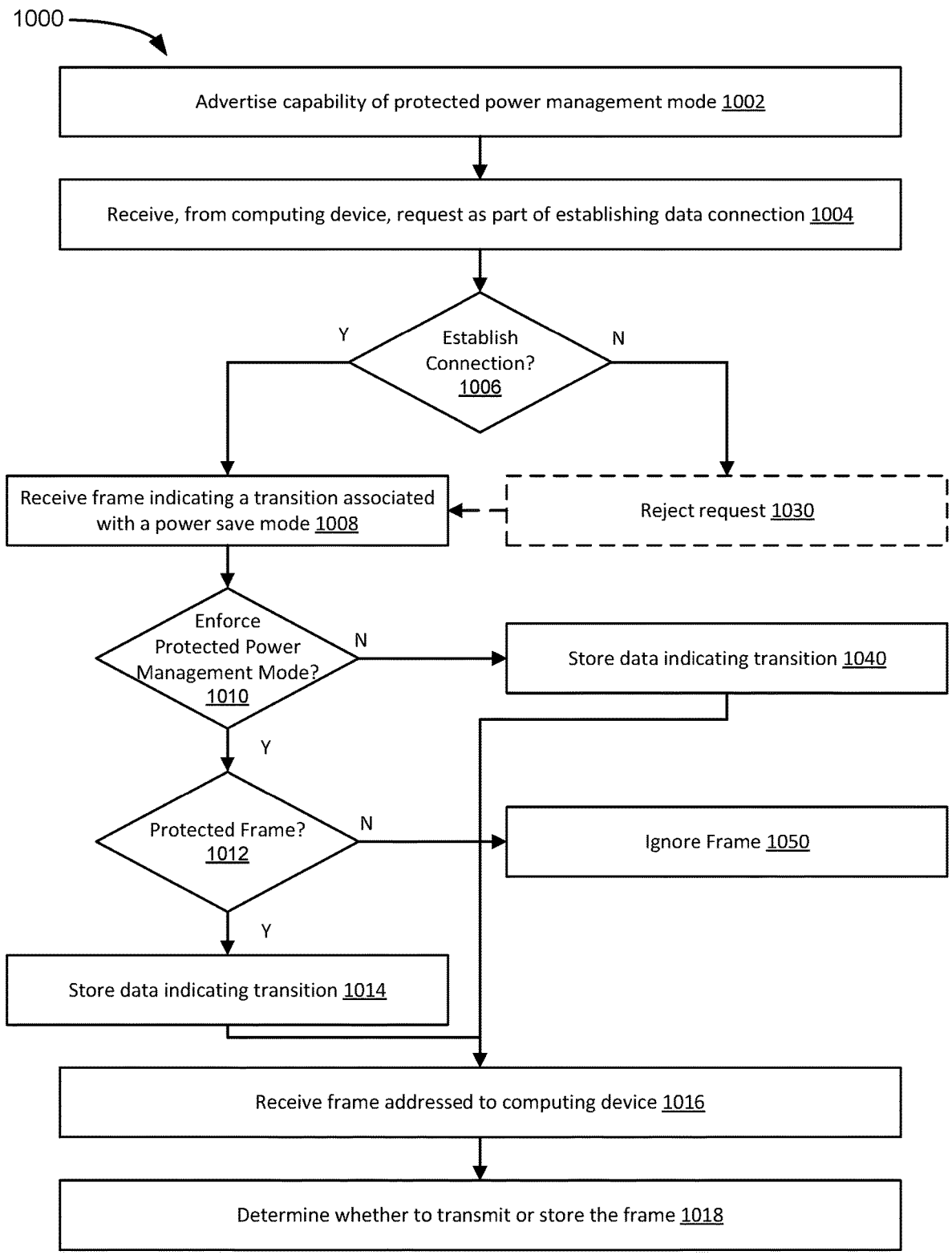
FIG. 10 illustrates another example flow of an access point managing transmission of frames based on a protected power management mode according to an embodiment of the present disclosure.

FIGS. 8-10 illustrate example flows for implementing a protected power management mode. Devices that form a BSS, including a computing device and an access point, are described as performing operations of the flows. Instructions for performing the operations can be stored as computer-readable instructions on non-transitory computer-readable media of the devices. As stored, the instructions represent programmable modules that include code executable by processors of the devices. The execution of such instructions configures the devices to perform the specific operations shown in the figures and described herein. Each programmable module in combination with the respective processor represents a means for performing a respective operation(s). While the operations are illustrated in a particular order, it should be understood that no particular order is necessary and that one or more operations may be omitted, skipped, and/or reordered.

FIG. 8 illustrates an example flow 800 of the computing device requesting the protected power management mode according to an embodiment of the present disclosure. As illustrated, the example flow 800 starts at operation 802, where the computing device receives a frame from the access point. In an example, the frame advertises the capability of the access point to provide the protected power management mode and any other protected modes as applicable (e.g., a protected keep-alive mode).

At operation 804, the computing device determines whether the protected power management mode is provided. In an example, example, the computing device determines from a first bit in an extended capabilities element or a vendor specific element of the received frame whether the access point supports the protected power management mode. The computing device can also determine from a second bit and a third bit in the extended capabilities element and/or the vendor specific element whether the access point has enabled the protected power management mode and necessitates the computing device to use the protected power management mode. Upon a determination that the protected power management mode is provided (e.g., based on this mode being supported, enabled, and/or necessitated), operation 806 follows operation 804. Otherwise, operation 808 follows operation 804.

At operation 806, the computing device transmits data requesting the protected power management mode and any other protected modes as applicable. In an example, the computing device sends a frame to the access point, where the frame includes a first bit indicating whether the computing device supports the protected power management mode, a second bit indicating whether the computing device has enabled the protected power management mode, and a third bit indicating whether the computing device necessitates the access point to use the protected power management mode. Such bits can be included in an extended capabilities element and/or an vendor specific element of the transmitted frame. Based on the capability advertised from the access point (e.g., some or all of the three bits transmitted from the access point) and the capability requested from the computing device (e.g., some or all of the three bits transmitted from the computing device), the access point can manage the update to power save mode data associated with the computing device and, thus, the transmission of frames to the computing device based on the transitions in and out of the power save mode, as further described in the next figures.

At operation 808, the computing device receives a frame, such as a data frame or a management frame, from the access point. In an example, this frame is received because the computing device is out of the power save mode.

At operation 810, the computing device transmits a protected frame that indicates that the computing device is entering in the power save mode. The protected frame can include a MAC header having a power management bit set to "1." In example, the protected frame is used upon a determination by the device that the protected power management mode is provided by the access point, such as based on a determination under operation 804 that the access point supports and has enabled the protected power management mode and necessitates the computing device to do the same.

Generally, whether to use a protected frame or an unprotected frame depends on whether the access point and/or the computing device provide the protected power management mode. Below is an illustrative Table 4 showing the type of frame to use depending on how the protected power management mode is provided.

TABLE 4

| Access Point | | | Computing Device | | | Result |
|---|---|---|---|---|---|---|
| Supported | Enabled | Necessitated | Supported | Enabled | Necessitated | Protected-Unprotected |
| 0 | 0 | 0 | 0 | 0 | 0 | Unprotected |
| 0 | 0 | 0 | 1 | 1 | 1 | No Connection |
| 0 | 0 | 0 | 1 | 1 | 0 | Protected |
| 0 | 0 | 0 | 1 | 0 | 0 | Unprotected |
| 1 | 0 | 0 | 0 | 0 | 0 | Unprotected |
| 1 | 1 | 0 | 0 | 0 | 0 | Unprotected |
| 1 | 1 | 0 | 1 | 0 | 0 | Unprotected |

TABLE 4-continued

| Access Point | | | Computing Device | | | Result |
|---|---|---|---|---|---|---|
| Supported | Enabled | Necessitated | Supported | Enabled | Necessitated | Protected-Unprotected |
| 1 | 1 | 0 | 1 | 1 | 0 | Protected |
| 1 | 1 | 1 | 0 | 0 | 0 | No connection |
| 1 | 1 | 1 | 1 | 1 | 0 | Protected |
| 1 | 1 | 1 | 1 | 1 | 1 | Protected |

At operation 812, the computing device transmits a protected frame that indicates that the computing device is exiting in the power save mode. The protected frame can include a MAC header having a power management bit set to "0." In example, the protected frame is used upon a determination by the device that the protected power management mode is provided by the access point, such as based on a determination under operation 804 that the access point supports and has enabled the protected power management mode and necessitates the computing device to do the same. In another example, whether to use a protected frame or an unprotected frame depends on whether the access point and/or the computing device provide the protected power management mode. The determination to use the protected frame or the unprotected frame can be performed according to Table 4 above.

At operation 814, the computing device receives a frame from the access point. In an example, this frame is received because the computing device is out of the power save mode and may have been buffered by the access point while the computing device was in the power save mode.

FIG. 9 illustrates an example flow 900 of the access point managing transmission of frames based on the protected power management mode according to an embodiment of the present disclosure. The flow 900 can be used such that the access point ignores any unprotected frame that are sent to indicate a power save mode transition.

As illustrated, the flow 900 starts at operation 902, where the access point advertises the capability of providing the protected power management mode. In an example, the access point uses an extended capabilities element and/or a vendor specific element to indicate how the protected power management mode is provided. For instance, bits can be set in extended capabilities element and/or a vendor specific element to indicate whether the access point supports the protected power management mode, whether the access point has enabled the protected power management mode, and/or whether the access point necessitates a computing device to have enabled the use of the protected power management mode. In addition, the access point can similarly advertise its capability of providing other protected modes, such as a protected keep-alive mode.

At operation 904, the access point receives a frame indicating that the computing device is entering a power save mode. The frame can include a MAC address of the computing device and a power management bit set to "1."

At operation 906, the access point determines whether the frame is protected or not. If the frame is unprotected, operation 930 follows operation 906, where the access point ignores the power management bit in the frame. If the frame is protected and the protection is verified (e.g., successful decryption and/or authentication), operation 908 follows operation 906.

At operation 908, the access point stores data indicating that the device is in the power save mode. In an example, the data associates the MAC address of the computing device with a bit representing that the corresponding computing device is in the power save mode.

At operation 910, the access point receives a frame addressed to the computing device. The frame can be a data frame or a management frame and include the MAC address of the computing device as the receiver address.

At operation 912, the access point determines that the computing device is in the power save mode. For example, the access point uses the MAC address included in the received frame to look up the stored data and determines that the corresponding bit indicates that the computing device is in the power save mode.

At operation 914, the access point stores the frame. In an example, the frame is stored in a memory buffer of the access point until the computing device exits the power save mode, for a predefined time duration, or until the computing device is disconnected.

At operation 916, the access point receives a frame indicating that the computing device is exiting the power save mode. The frame can include a MAC address of the computing device and a power management bit set to "0."

At operation 918, the access point determines whether the frame is protected or not. If the frame is unprotected, operation 930 follows operation 918, where the access point ignores the power management bit in the frame. If the frame is protected and the protection is verified (e.g., successful decryption and/or authentication), operation 920 follows operation 918.

At operation 920, the access point stores data indicating that the device is out of the power save mode. In an example, the data associates the MAC address of the computing device with a bit representing that the corresponding computing device is out of the power save mode.

At operation 922, the access point transmits the stored frame to the computing device. In particular, the stored frame is transmitted because the computing device is determined to no longer be in the power save mode.

FIG. 10 illustrates another example flow 1000 of the access point managing transmission of frames based on the protected power management mode according to an embodiment of the present disclosure. The flow 1000 can be used such that the access point can determine whether to ignore any unprotected frames that are sent to indicate a power save mode transition. If such a frame is not to be ignored, the access point can update the data stored about the power save mode of the computing device. The determination can depend on the capability advertised by the access point and the capability requested by the computing device.

In an example, the determination can be performed according to Table 4 above. Of course other implementations are possible for this determination. For instance, the illustrative Table 5 below can be used.

TABLE 5

| Access Point | Computing Device | | Behavior |
|---|---|---|---|
| Protected Power Management Mode Necessitated | Protected Power Management Mode Enabled | Protected Power Management Mode Enabled | |
| 0 | 0 | X (do not care) | Unprotected frames may be used. |
| 0 | 1 | 0 | Computing device can connect with access point. Unprotected frames may be used for power management transition. |
| 0 | 1 | 1 | Computing device can connect with access point. Only protected power management frames can be used by computing device. Any unprotected frames used for power management by computing device would be ignored and would not be further processed by access point. |
| 1 | 0 | X/missing | Unprotected frames may be used. |
| 1 | 1 | 0/missing | Computing device cannot connect with access point. Access point rejects association request by sending association response with non-zero status code. |
| 1 | 1 | 1 | Computing device can connect with access point. Only protected power management frames can be used by this computing device. Any unprotected frames used for power management by computing device would be ignored and would not be further processed by access point. |

As illustrated, the flow 1000 starts at operation 1002, where the access point advertises the capability of providing the protected power management mode. In an example, the access point uses an extended capabilities element and/or a vendor specific element to indicate how the protected power management mode is provided. For instance, bits can be set in extended capabilities element and/or a vendor specific element to indicate whether the access point supports the protected power management mode, whether the access point has enabled the protected power management mode, and/or whether the access point necessitates a computing device to have enabled the use of the protected power management mode. In addition, the access point can similarly advertise its capability of providing other protected modes, such as a keep-alive mode. In an example, advertising the capability includes sending a beacon frame to the computing device. The beacon frame can indicate that a protected frame feature is to be used for communications with the access point, such as to indicate a transition into the power save mode or out of the power save mode. The protected frame feature corresponds to a type of protection to be used to communicate information regarding change in a power mode For instance, the protected frame feature can indicate that a payload of a frame should be encrypted, a MAC header of the frame should be authenticated, and/or the frame itself should be authenticated, where the frame is sent in the communications to indicate the change in the power mode.

At operation 1004, the access point receives, from the computing device a request as part of establishing a data connection. In an example, the request is transmitted from the computing device as an association request frame. This association request frame can indicate the requested capability. For instance, the association request frame includes data that indicates whether the computing device supports the protected frame feature, such as the capability to encrypt frame payloads, authenticate MAC headers, and/or authenticate frames used to indicate the power save mode transition. The data can also indicate whether the computing device has enabled and/or necessitates the protected frame feature. The data can be included in an extended capabilities element and/or a vendor specific element in the association request frame to indicate how the protected power management mode is provided. For instance, bits can be set in extended capabilities element and/or a vendor specific element to indicate whether the computing device supports the protected power management mode, whether the computing device has enabled the protected power management mode, and/or whether the computing necessitates an access point to have enabled the use of the protected power management mode. In addition, the computing device can similarly request the capability of providing other protected modes, such as a protected keep-alive mode.

At operation 1006, the access point determines whether the data connection can be established. In an example, this determination depends on the advertised capability and the requested capability. In particular, if the advertised capability necessitates the protected power management mode and the computing device indicates that such a mode is enabled on the computing device, the determination is to proceed with establishing the data connection. In this case, operation 1008 follow operation 1006. Otherwise, operation 1030 follows operation 1006, where the access point can reject the association request by sending an association response frame with a non-zero status code. Rejecting the association request corresponds to a failure to establish the data connection by not establishing the data connection.

At operation 1008, the access point receives a frame indicating a transition associated with a power save mode. The frame can include the MAC address of the computing device as the source address and can include data, such as a power management bit, indicating that the computing device is transitioning in or out of the power save mode. The frame can be protected or unprotected. In addition, in the case of attempted spoofing, the frame can be transmitted from another computing device. Otherwise, the frame is transmitted from the computing device. An example of a protected frame is an ARP frame sent per the protected frame feature that the computing device supports and has enabled (e.g., having an encrypted payload and/or including authentication data).

At operation 1010, the access point determines whether to enforce the protected power management mode. This determination can also depend on the advertised capability and the requested capability and involve, for instance, using any of Table 4 or Table 5. Generally, if any of the access point and computing device necessitates the protected power management mode and such a mode has been enabled, the determination is to enforce the protected power management mode, whereby only protected frames (e.g., frames that conform with the protected frame feature such as by being protected accordingly) are usable to indicate the power save mode transition. If none of the access point and computing device necessitates the protected power management mode, the use of protected frames depends on whether both the access point and computing devices have enabled the protected power management mode. If both have enabled such mode, only the protected frames are usable to indicate the power save mode transition. Otherwise, unprotected frames (e.g., frames that do not conform with the protected frame feature) may be usable. In case a determination is made to enforce the protected power management mode, operation 1012 follows operation 1010. Otherwise, operation 1040 follows operation 1010. At operation 1040, the access point processes the frame received at operation 1008 to determine the power management bit and stores data indicating the power save mode of the computing device according to the power management bit. Operation 1040 can be followed by operation 1016.

At operation 1012, the access point has determined that the protected power management mode is to be enforced, whereby only protected frames are usable to indicate the power save mode transition. Accordingly, at operation 1012, the access point determines whether the frame received at operation 1008 is protected. If the frame is unprotected (e.g., no encryption, no authentication, decryption fails, and/or authentication fails, such as in a null frame or any other frame that does not conform with the protected frame feature), operation 1050 follows operation 1012, where the access point ignores the power management bit in the frame and discards the frame. If the frame is protected (e.g., encrypted and/or authenticated) and the protection is verified (e.g., successful decryption and/or authentication), operation 1014 follows operation 1012.

At operation 1014, the access point processes the protected frame (e.g., in addition to the decryption and authentication, the access point parses the MAC header to determine the value of the power management bit) and stores data indicating the power save mode of the computing device according to the power management bit.

At operation 1016, the access point receives a frame addressed to the computing device. The frame can be a data frame or a management frame and include the MAC address of the computing device as the receiver address and data in the payload of the frame.

At operation 1018, the access point determines whether to transmit the frame to the computing device or delay the transmission by storing the frame in a memory buffer. The determination depends on whether the computing device is in or out the power save mode. And the data stored for the computing device about its power save mode is used to perform this determination. If the frame (e.g., the received data in the payload of the frame) is to be transmitted, the access point transmits the frame to the computing device. Otherwise, the access point refrains from the transmitting the frame by storing the frame in a memory buffer of the access point until, for instance, a determination is made that the device is no longer in the power save mode.

At operation 1030, the access point can reject the association request by sending an association response frame with a non-zero status code. If rejected, no data connection is established between the access point and the computing device. If not rejected, operation 1008 follows operation 1030, once the data connection is established. Whether to reject the association request can depend on a number of factors including how the computing device supports the protected power management mode. In an example, the access point advertises that the use of the protected power management mode is necessitated, per operation 1002. In this case, the access point also receives an indication from the computing device that a mode is supported per operation 1004. Because the access point necessitates the protected power management mode and because the computing device can support such a mode, the access point can reject the association request because the computing device has not enabled protected power management mode yet. In another example, if the computing device has not indicated that it can support the protected power management mode (e.g., the computing device is a legacy device that has not been configured or updated to support such a capability), the access point can accept the association request.

Figure 11:
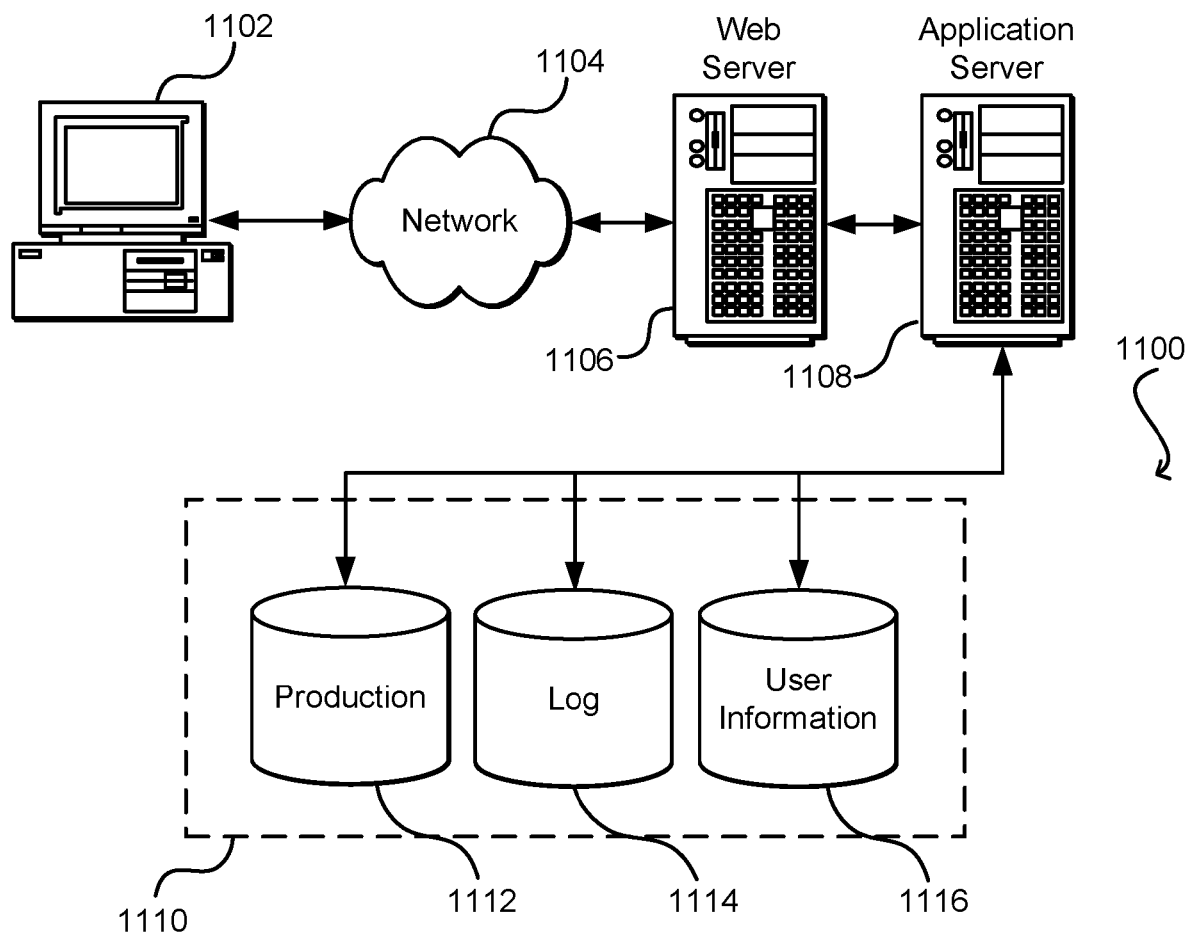
FIG. 11 illustrates a diagram showing an example of computer architecture according to an embodiment of the present disclosure.

FIG. 11 illustrates a diagram showing an example computer architecture according to an embodiment of the present disclosure. This architecture may be used to implement some or all of the systems described herein. The computer architecture shown in FIG. 11 illustrates a server computer, workstation, desktop computer, laptop, tablet, network appliance, personal digital assistant ("PDA"), e-reader, digital cellular phone, or other computing device, and may be utilized to execute any aspects of the software components presented herein.

The computer 1100 includes a baseboard 1102, or "motherboard," which is a printed circuit board to which a multitude of components or devices may be connected by way of a system bus or other electrical communication paths. In one illustrative embodiment, one or more central processing units ("CPUs") 1104 operate in conjunction with a chipset 1106. The CPUs 1104 may be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 may provide an interface to a random access memory ("RAM") 1108, used as the main memory in the computer 1100. The chipset 1106 may further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM may also store other software components necessary for the operation of the computer 1100 in accordance with the embodiments described herein.

The computer 1100 may operate in a networked environment using logical connections to remote computing devices and computer systems through a network, such as the local area network 1120. The chipset 1106 may include functionality for providing network connectivity through a NIC 1112, such as a gigabit Ethernet adapter. The NIC 1112 is capable of connecting the computer 1100 to other computing devices over the network 1120. It should be appreciated that multiple NICs 1112 may be present in the computer 1100, connecting the computer to other types of networks and remote computer systems.

The computer 1100 may be connected to a mass storage device 1118 that provides non-volatile storage for the computer. The mass storage device 1118 may store system programs, application programs, other program modules, and data, which have been described in greater detail herein. The mass storage device 1118 may be connected to the computer 1100 through a storage controller 1114 connected to the chipset 1106. The mass storage device 1118 may consist of one or more physical storage units. The storage controller 1114 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 may store data on the mass storage device 1118 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1118 is characterized as primary or secondary storage, and the like.

For example, the computer 1100 may store information to the mass storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 may further read information from the mass storage device 1118 by detecting the physical states or characteristics of one or more particular locations within the physical storage units.

In addition to the mass storage device 1118 described above, the computer 1100 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1100.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1118 may store an operating system 1130 utilized to control the operation of the computer 1100. According to one embodiment, the operating system comprises the LINUX operating system. According to another embodiment, the operating system comprises the WINDOWS® SERVER operating system from MICROSOFT Corporation.

According to further embodiments, the operating system may comprise the UNIX or SOLARIS operating systems. It should be appreciated that other operating systems may also be utilized.

The mass storage device 1118 may store other system or application programs and data utilized by the computer 1100. The mass storage device 1118 might also store other programs and data not specifically identified herein.

In one embodiment, the mass storage device 1118 or other computer-readable storage media is encoded with computer-executable instructions which, when loaded into the computer 1100, transforms the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various routines described above. The computer 1100 might also include computer-readable storage media for performing any of the other computer-implemented operations described herein.

The computer 1100 may also include one or more input/output controllers 1116 for receiving and processing input from a number of input devices, such as a keyboard, a mouse, a touchpad, a touch screen, an electronic stylus, or other type of input device. Similarly, the input/output controller 1116 may provide output to a display, such as a computer monitor, a flat-panel display, a digital projector, a printer, a plotter, or other type of output device. It will be appreciated that the computer 1100 may not include all of the components shown in FIG. 11, may include other components that are not explicitly shown in FIG. 11, or may utilize an architecture completely different than that shown in FIG. 11. It should also be appreciated that many computers, such as the computer 1100, might be utilized in combination to embody aspects of the various technologies disclosed herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A method implemented by an access point (AP), comprising:
    transmitting, to a device, a beacon frame indicating that a protected frame feature is to be used for a transition of the device to a power save mode;
    receiving, from the device, an association request frame, the association request frame including first data that indicates that the device supports the protected frame feature;
    establishing, based on the first data, a data connection with the device;
    receiving, from the device, a first address resolution protocol (ARP) frame per the protected frame feature, the first ARP frame including a media access control (MAC) address of the device, first power management data, and an encrypted payload, the encrypted payload including authentication data;
    determining, upon an authentication of the first ARP frame based on the authentication data, that the first power management data indicates the transition of the device to the power save mode;
    receiving second data addressed to the device;
    refraining from transmitting the second data to the device;
    receiving, from the device, a second ARP frame per the protected frame feature, the second ARP frame including second power management data;
    determining, upon an authentication of the second ARP frame, that the second power management data indicates the transition of the device out of the power save mode; and
    transmitting the second data to the device.

2. The method of claim 1, further comprising:
    receiving a null frame that includes the MAC address of the device and the first power management data;
    determining that the null frame does not conform with the protected frame feature; and
    ignoring the null frame.

3. The method of claim 1, further comprising:
    receiving, from a second device, a second association request frame, the second association request frame including third data, the third data (a) indicating that the second device does not use the protected frame feature or (b) not including an indication that the second device is to use the protected frame feature;
    determining a rejection to establish a second data connection between the AP and the second device in response to the second association request frame; and
    transmitting an association response frame indicating the rejection.

4. A network access device comprising:
    one or more processors; and
    one or more memories storing instructions that, upon execution by the one or more processors, cause the network access device to:
        transmit a first frame indicating that a protected frame feature is to be used to communicate information regarding change in a power mode, the protected frame feature indicating that the information is to be associated with at least one of encrypted data or authentication data;
        receive, from a device, a second frame that includes an identifier of the device and first data indicating a change in the power mode of the device;
        determine that the second frame conforms with the protected frame feature by at least determining that the second frame includes the at least one of encrypted data or authentication data;
        receive second data addressed to the device; and
        refrain from transmitting the second data to the device.

5. The network access device of claim 4, wherein the first data indicates that the device is entering or has entered a power save mode, and wherein the one or more memories store further instructions that, upon execution by the one or more processors, cause the network access device to:
    store the second data based at least in part on (i) the second frame conforming with the protected frame feature and (ii) the device being in the power save mode or entering the power save mode.

6. The network access device of claim 4, wherein the first data indicates that the device is entering or has entered a power save mode, and wherein the one or more memories store further instructions that, upon execution by the one or more processors, cause the network access device to:
- receive a third frame that includes the identifier of the device and third data, the third data indicating that the device is exiting or has exited the power save mode; and
- transmit the second data to the device.

7. The network access device of claim 6, wherein the one or more memories store additional instructions that, upon execution by the one or more processors, cause the network access device to:
- receive, from the device and prior to receiving the third frame, fourth data indicating that the protected frame feature is to be used by the device, wherein transmitting the second data is based at least in part on the fourth data.

8. The network access device of claim 4, wherein the first frame further indicates that the network access device supports the protected frame feature, and wherein the one or more memories store further instructions that, upon execution by the one or more processors, cause the network access device to:
- receive, from the device and prior to receiving the second frame, a third frame indicating that the protected frame feature is to be used; and
- establish a data connection with the device.

9. The network access device of claim 4, wherein the first frame further indicates that the network access device supports the protected frame feature, and wherein the one or more memories store further instructions that, upon execution by the one or more processors, cause the network access device to:
- receive, from a second device, a third frame indicating that the second device does not use the protected frame feature or missing an indication that the second device is to use the protected frame feature; and
- cause a failure to establish a data connection between the network access device and the second device based at least in part on the first frame and the third frame.

10. The network access device of claim 4, wherein the one or more memories store further instructions that, upon execution by the one or more processors, cause the network access device to:
- receive, from a second device and, a third frame indicating that the second device is to use frames that do not conform with the protected frame feature;
- receive, from the second device, a null frame indicating that the second device is entering or has entered a power save mode;
- receive third data addressed to the second device; and
- refrain from transmitting the third data to the second device.

11. The network access device of claim 4, wherein the first data indicates that the device is entering or has entered a power save mode, and wherein the one or more memories store further instructions that, upon execution by the one or more processors, cause the network access device to:
- receive, from the device, a third frame that includes the identifier of the device and third data indicating that the device is exiting or has exited the power save mode;
- determine that the third frame conforms with the protected frame feature; and
- transmit, to the device, the second data.

12. A system comprising:
a network access device that includes one or more processors and one or more memories storing instructions that, upon execution by the one or more processors, configure the network access device to:
- transmit a first frame indicating that a protected frame feature is to be used to communicate information regarding change in a power mode;
- receive, from a device, first data indicating that the protected frame feature is to be used by the device;
- receive, from the device and after receiving the first data, a second frame that includes an identifier of the device and second data indicating a change to the power mode of the device;
- determine that the second frame conforms with the protected frame feature;
- receive third data addressed to the device; and
- refrain from transmitting the third data to the device.

13. The system of claim 12, wherein the first frame includes a media access control (MAC) header, wherein the MAC header includes an extended capabilities element, and wherein the extended capabilities element includes one or more bits indicating the protected frame feature.

14. The system of claim 12, wherein the first frame includes a media access control (MAC) header, wherein the MAC header includes a vendor specific element, and wherein the vendor specific element includes one or more bits indicating the protected frame feature.

15. The system of claim 12, wherein the first frame includes a first bit indicating that the network access device supports the protected frame feature, and wherein the first frame further includes a second bit indicating that the network access device discards a frame that is sent to indicate the change in the power mode and that does not conform with the protected frame feature.

16. The system of claim 15, wherein the first frame includes a third bit indicating that the network access device supports a protected keep-alive frame, and wherein the first frame further includes a fourth bit indicating that the network access device discards an unprotected keep-alive frame.

17. The system of claim 16, wherein the first frame includes a fifth bit indicating whether an association with the device is permitted based at least in part on a use of the protected frame feature by the device.

18. The system of claim 12, wherein the first frame comprises at least one of: a beacon frame, a probe response frame, or an association response frame.

* * * * *